(12) United States Patent
Takahashi et al.

(10) Patent No.: US 9,309,118 B2
(45) Date of Patent: Apr. 12, 2016

(54) OZONE GENERATING APPARATUS

(71) Applicant: KABUSHIKI KAISHA TOSHIBA, Minato-ku (JP)

(72) Inventors: Ryoichi Takahashi, Yokosuka (JP); Takaaki Murata, Kawasaki (JP); Kazuhiko Noda, Hino (JP); Kie Kubo, Toshima (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 14/420,472

(22) PCT Filed: Mar. 14, 2013

(86) PCT No.: PCT/JP2013/057285
§ 371 (c)(1),
(2) Date: Feb. 9, 2015

(87) PCT Pub. No.: WO2014/024510
PCT Pub. Date: Feb. 13, 2014

(65) Prior Publication Data
US 2015/0239737 A1    Aug. 27, 2015

(30) Foreign Application Priority Data
Aug. 9, 2012   (JP) .................................. 2012-177398

(51) Int. Cl.
*C01B 13/11*   (2006.01)
*H01T 23/00*   (2006.01)

(52) U.S. Cl.
CPC ............... *C01B 13/115* (2013.01); *C01B 13/11* (2013.01); *C01B 2201/22* (2013.01); *C01B 2201/32* (2013.01); *H01T 23/00* (2013.01)

(58) Field of Classification Search
CPC .. C01B 13/115; C01B 13/11; C01B 2201/22; C01B 2201/32; H01T 23/00
IPC ........ C01B 13/115, 2201/14, 2201/22, 2201/20
See application file for complete search history.

(56) References Cited

U.S. PATENT DOCUMENTS

2012/0156106 A1*   6/2012  Murata et al. .............. 422/186.2
2015/0004070 A1    1/2015  Murata et al.

FOREIGN PATENT DOCUMENTS

JP      8-320212 A    12/1996
JP     10-182109 A     7/1998
(Continued)

OTHER PUBLICATIONS

International Search Report issued May 21, 2013 in PCT/JP2013/057285.
(Continued)

*Primary Examiner* — Kishor Mayekar
(74) *Attorney, Agent, or Firm* — Oblon, McClelland, Maier & Neustadt, L.L.P.

(57) ABSTRACT

An ozone generating apparatus includes a cylindrical high-voltage electrode and a coaxially arranged cylindrical low-voltage electrode. A predetermined high voltage is applied between the high-voltage and low-voltage electrodes via a dielectric substance to cause discharge generating ozone, the discharge gap length being 0.3 to 0.5 mm. One of the low-voltage and high-voltage electrodes is a metal electrode and the other a dielectric electrode. A projection group including plural done shape projections, arranged on same circumference of the metal electrode, is arranged on an inner peripheral surface of the metal electrode to hold the metal electrode coaxial with the dielectric electrode while keeping the discharge gap length. The projection group is arranged at a center portion in a longitudinal direction of the discharging space positioned away from both ends of the discharging space by a predetermined distance $L_3$ satisfying, $0.0 \le L_3/L \le 0.1$, L being length of the discharging space.

6 Claims, 27 Drawing Sheets

(56) References Cited

FOREIGN PATENT DOCUMENTS

| | | | |
|---|---|---|---|
| JP | 2001-151503 A | | 6/2001 |
| JP | 2006-76837 A | | 3/2006 |
| JP | 2009-96693 | * | 5/2009 |
| JP | 2010-248017 A | | 11/2010 |
| JP | 2012-144425 A | | 8/2012 |
| WO | WO 2007/108142 A1 | | 9/2007 |

OTHER PUBLICATIONS

Office Action issued May 21, 2013 in Japanese Patent Application No. 2012-177398 (submitting English language translation only).

Office Action issued Aug. 13, 2013 in Japanese Patent Application No. 2012-177398 (submitting English language translation only).

* cited by examiner

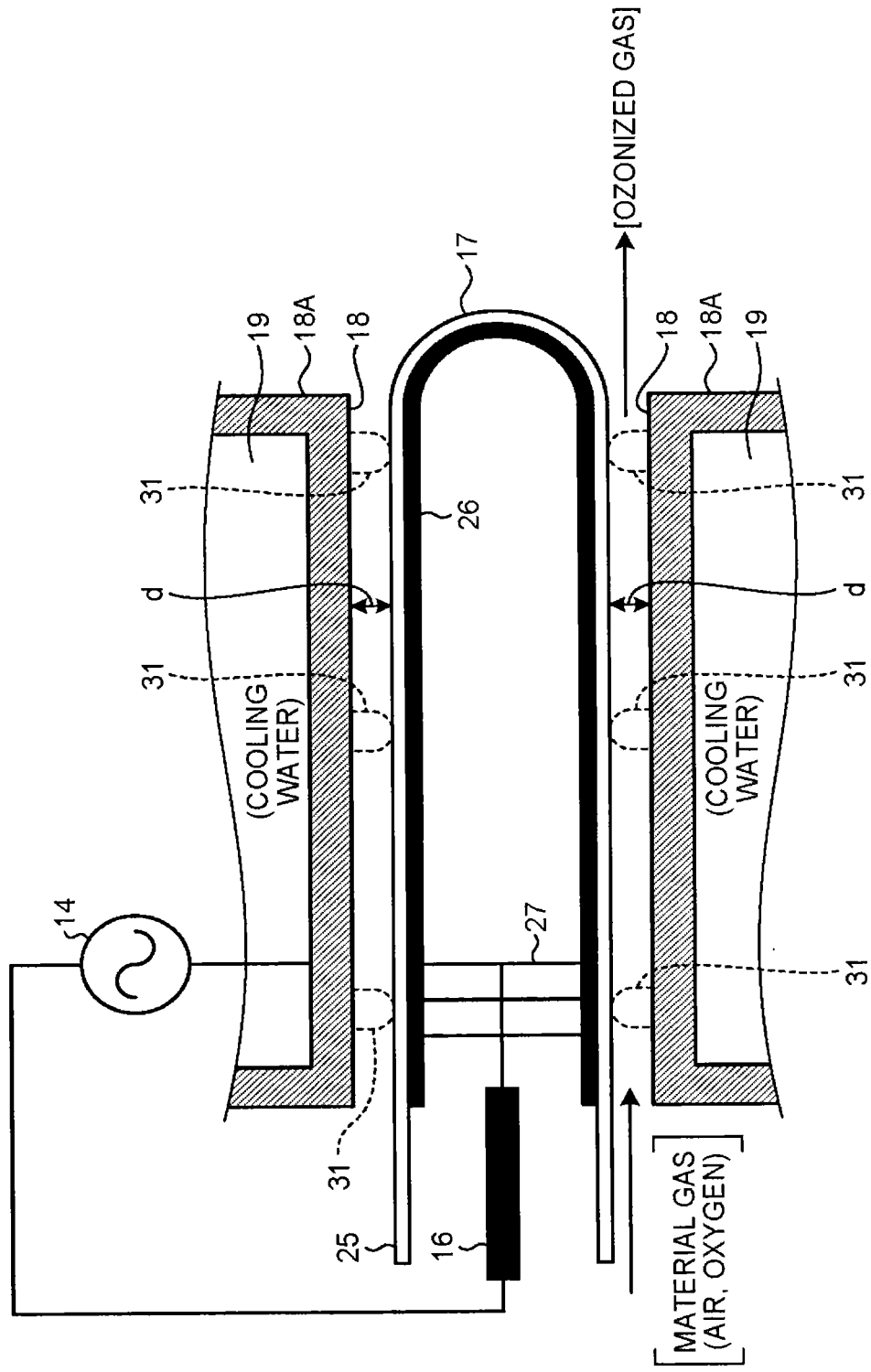

[A-A SECTION]

ONE MOUNTAIN PART
(FIRST-ORDER COMPONENT)

TWO MOUNTAIN PARTS
(SECOND-ORDER COMPONENT)

A-A SECTION

B-B SECTION

C-C SECTION

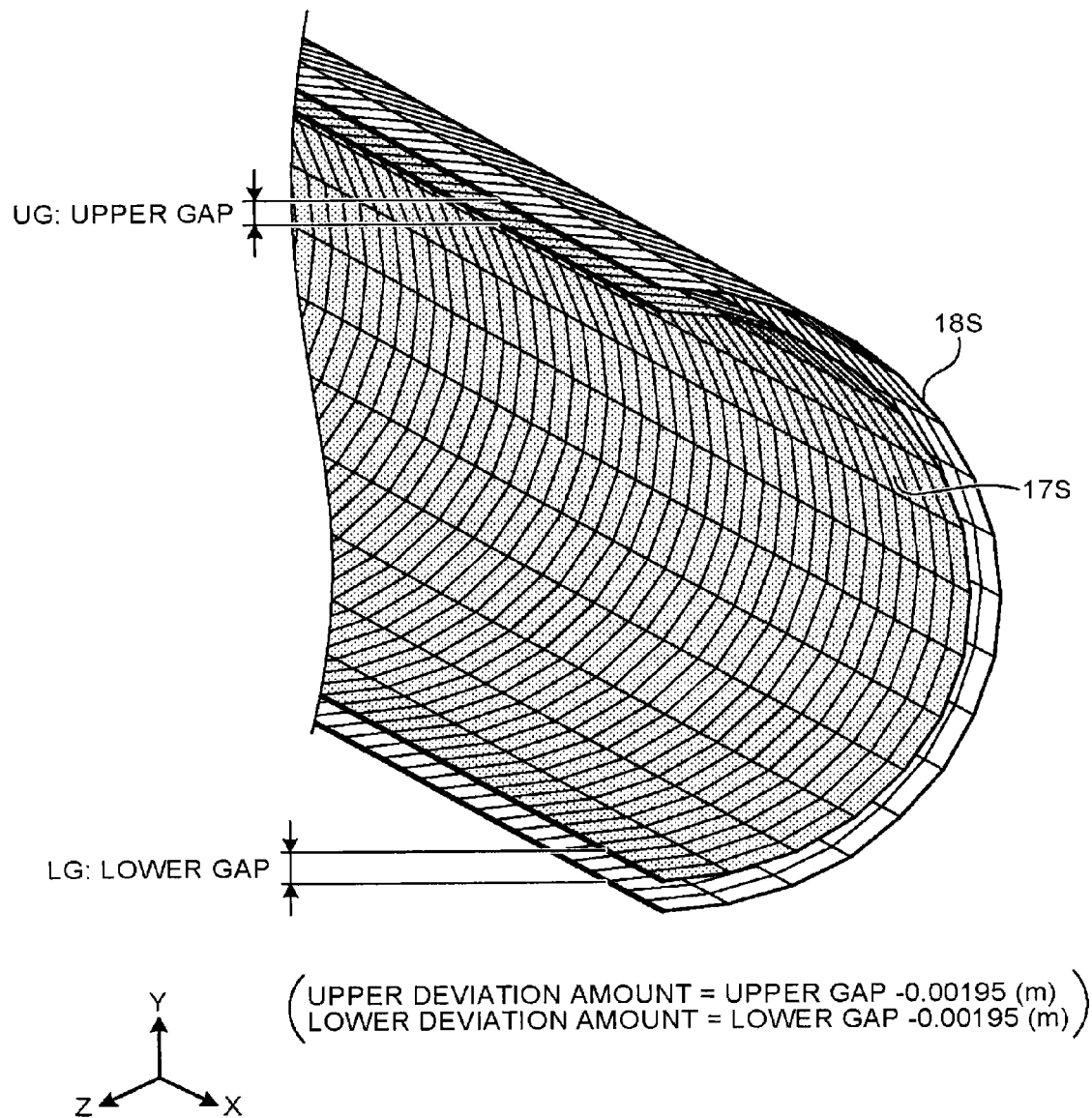

(NUMBER OF PROJECTIONS 3)

(NUMBER OF PROJECTIONS 4)

(NUMBER OF PROJECTIONS 5)

(NUMBER OF PROJECTIONS 6)

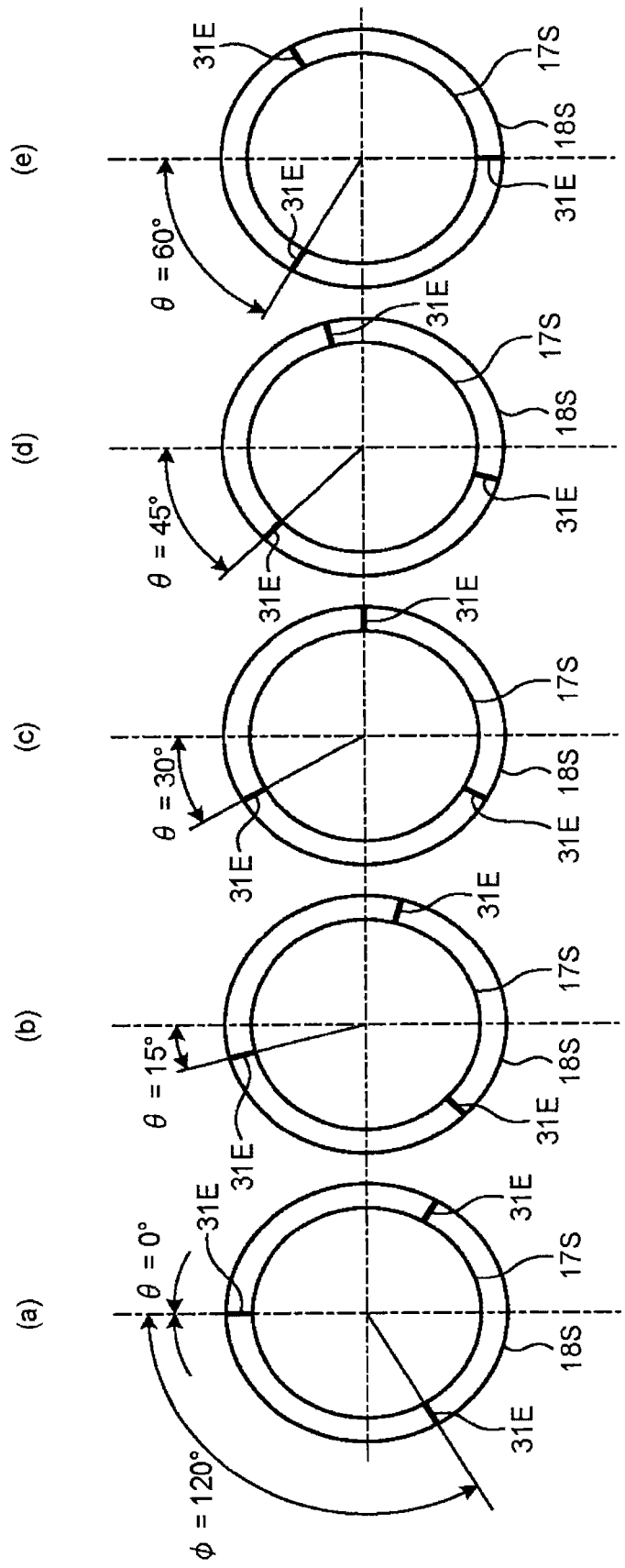

OZONE GENERATING APPARATUS

CROSS-REFERENCE TO RELATED APPLICATIONS

This application is national stage application of International Application No. PCT/JP2013/057285, filed Mar. 14, 2013, which designates the United States, incorporated herein by reference.

FIELD

Embodiments described herein relate generally to an ozone generating apparatus.

BACKGROUND

Ozone generating apparatuses generally include a dielectric electrode and a metal electrode arranged in an airtight container. A spacer for forming a discharge gap is interposed between the dielectric electrode and the metal electrode. A conductive film is arranged on an inner face of the dielectric electrode.

In such an ozone generating apparatus, material gas introduced into the airtight container from a gas inlet flows through the discharge gap formed between the dielectric electrode and the metal electrode. The material gas that has flowed through the discharge gap is then discharged from a gas outlet.

In parallel with the introduction of the material gas, an AC high voltage is applied between the dielectric electrode and the metal electrode from a high-voltage power supply via a fuse and a high-voltage power supply terminal.

When the AC high voltage is applied, dielectric barrier discharge is generated in the discharge gap and ozone is generated. The dielectric barrier discharge may be simply referred to as barrier discharge or silent discharge in some cases.

The heat generated by the dielectric barrier discharge is cooled with cooling water supplied into a cooling water flow path formed with the metal electrode and the airtight container. This configuration can suppress temperature rise of the gas in the discharge gap to efficiently obtain the ozone.

In general ozone generating apparatuses known in the art, a discharge gap length d is assumed to be 0.6 mm to 1.3 mm. A gas pressure p of air serving as the material gas is assumed to be 0.17 to 0.28 MPa (absolute pressure).

A product of the gas pressure p of the material gas and the discharge gap length d is commonly called a pd product. When the pd product is made constant, similarity law of discharge is established. This is because the pd product represents the number of gas molecules in the discharge gap.

For example, multiplication of electrons traveling through the discharge gap is represented by a product $\alpha d$ of an ionization coefficient $\alpha$ of the gas and the discharge gap length d.

The product $\alpha d$ is then rewritten as follows.

$$\alpha d = (\alpha/p)(pd)$$

where /p represents ionization caused by a single collision, and the pd product represents the number of molecules included in the discharge gap. For that reason, famous Paschen's law that gives a sparkover voltage is a function of the pd product.

The discharge gap length d that has been used is within a region of 0.6 mm or more as described above. In the region in which the discharge gap length d=0.6 mm or more, an optimum value of the pd product with respect to a yield of ozone is a constant value around 20 kPa·cm. Due to this, it has been difficult to further improve the yield of ozone.

Accordingly, the discharge gap length d may be an optimum value of less than 0.6 mm to improve the yield of ozone.

A spacer made of a stainless steel plate (sheet metal spacer) has been used to form the discharge gap.

In view of strength, a thickness of an available ring-shaped sheet metal spacer is about 0.2 mm. For example, when the discharge gap length is assumed to be 0.4 mm, the entire space is substantially filled and is hardly used.

The dielectric electrode is inserted into the sheet metal spacer only at both ends thereof because of its structure. The metal electrode (such as a stainless steel tube) and the dielectric electrode (discharge tube) are both somewhat bent. Due to this, the discharge gap length d does not reach a desired value at a center portion in which the sheet metal spacer cannot be inserted. As a result, ozone generation efficiency (g/kWh) becomes lower than a theoretical value.

The present invention provides an ozone generating apparatus that can keep the discharge gap length constant in a longitudinal direction and achieve higher yield of ozone even when the discharge gap length is less than 0.6 mm.

An ozone generating apparatus according to an embodiment arranges a cylindrical low-voltage electrode coaxially with respect to a cylindrical high-voltage electrode, and applies a predetermined high voltage between the high-voltage electrode and the low-voltage electrode via a dielectric substance to cause discharge for generating ozone.

A discharge gap length d is assumed to be 0.3 mm to 0.5 mm.

Furthermore, any one of the low-voltage electrode and the high-voltage electrode is formed as a metal electrode, and the other one is formed as a dielectric electrode.

A projection group including a plurality of projections is arranged on an inner peripheral surface of the metal electrode opposed to the dielectric electrode for holding the metal electrode to be coaxial with the dielectric electrode while keeping the discharge gap length.

BRIEF DESCRIPTION OF THE DRAWINGS

FIG. 2 is a diagram for explaining a principle of ozone generation in the ozone generating apparatus according to the embodiment;

FIG. 13 is a partial sectional perspective view of the finite element method model according to the embodiment;

FIG. 25 is an explanatory diagram of a repulsive force calculation condition when the number of projections=3 according to the embodiment;

DETAILED DESCRIPTION

According to an embodiment, an ozone generating apparatus comprises a cylindrical high-voltage electrode and a cylindrical low-voltage electrode that is arranged coaxially with respect to the cylindrical high-voltage electrode. The ozone generating apparatus applies a predetermined high voltage between the high-voltage electrode and the low-voltage electrode via a dielectric substance to cause discharge for generating ozone, wherein a discharge gap length d is 0.3 mm to 0.5 mm, any one of the low-voltage electrode and the high-voltage electrode is formed as a metal electrode, and the other one is formed as a dielectric electrode, a projection group including a plurality of projections having dome shape, which are arranged on same circumference of the metal electrode, is arranged on an inner peripheral surface of the metal electrode opposed to the dielectric electrode for holding the metal electrode to be coaxial with the dielectric electrode while keeping the discharge gap length, and the projection group is arranged at three or more positions, that is, a center portion in a longitudinal direction of a discharging space and positions away from both ends of the discharging space by a predetermined distance $L_3$ which satisfies the following expression, $0.0 \leq L_3/L \leq 0.1$ where L is length of the discharging space.

The following describes an embodiment with reference to the drawings.

Figure 1:
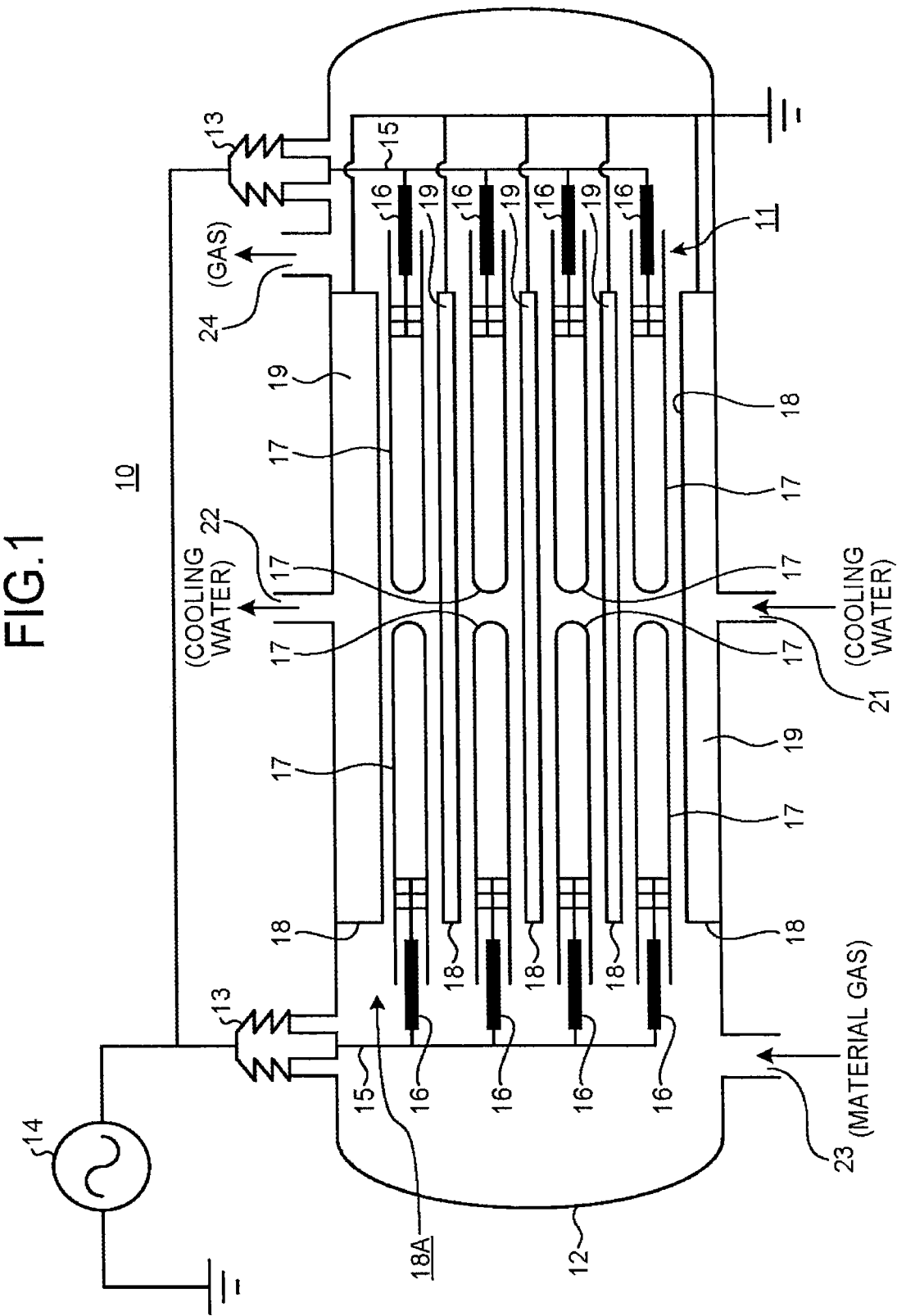
FIG. 1 is an overview sectional view of an ozone generating apparatus according to an embodiment.

FIG. 1 is an overview sectional view of an ozone generating apparatus according to the embodiment.

An ozone generating apparatus 10 according to the embodiment is configured as a dielectric barrier discharge ozone generating apparatus.

The ozone generating apparatus 10 roughly includes an ozone generating apparatus main body 11, a storage container 12 that stores therein the ozone generating apparatus main body 11 in airtight state, and a high-voltage power supply (high-voltage AC power supply) 14 that supplies electric power for generating ozone to the ozone generating apparatus main body 11 in the storage container 12 via a high-tension insulator 13.

The ozone generating apparatus main body 11 in the storage container 12 includes a plurality of dielectric electrodes 17 and a cylindrical metal electrode 18 made of stainless steel arranged therein. The electric power for generating ozone is supplied to the dielectric electrodes 17 via a fuse 16 and a connecting plate 15 electrically connected to the high-tension insulator 13. The metal electrode 18 is arranged to be opposed to each outer peripheral surface of the dielectric electrode 17 and be kept in a coaxial state while keeping a predetermined discharge gap length d.

In FIG. 1, the dielectric electrodes 17 are coaxially inserted into the metal electrode 18 from both the left and the right directions. The dielectric electrode 17 functions as a high-potential side electrode because the high-voltage power supply is supplied thereto.

On a surface of the metal electrode 18 opposite to the surface facing the dielectric electrode 17, a cooling water flow path 19 is formed integrally with the metal electrode 18. That is, a metal electrode aggregate 18A having a honeycomb shape is configured as a whole. The metal electrode aggregate 18A is grounded and the metal electrode 18 functions as a low-potential side electrode.

The cooling water flow path 19 provided on the back surface of the metal electrode 18 is arranged between a cooling water inlet 21 through which the cooling water is introduced and a cooling water outlet 22 through which the cooling water is led out that are provided to the storage container 12.

In addition, the storage container 12 includes a gas inlet 23 through which material gas is introduced and a gas outlet 24 through which unreacted material gas and ozone ($O_3$) are led out.

FIG. 2 is a diagram for explaining a principle of ozone generation in the ozone generating apparatus according to the embodiment.

As described above, the dielectric electrode 17 having a cylindrical shape is arranged in the storage container 12. The cylindrical metal electrode 18 is arranged opposite to an outer peripheral surface of the dielectric electrode 17 while keeping the predetermined discharge gap length d.

The following describes a detailed configuration of the dielectric electrode.

The dielectric electrode 17 includes a cylindrical dielectric substance 25 formed in a cylindrical shape (test tube shape) with quartz glass and the like having a small thermal expansion coefficient as a dielectric substance having a heat resistance and a voltage resistance. An electrode film layer 26 serving as a conductive electrode (high-potential side electrode) is formed on an inner peripheral surface of the cylindrical dielectric substance 25. A high-voltage power supply terminal 27 connected to the high-voltage power supply 14 via the fuse 16 is connected to the electrode film layer 26.

In the configuration described above, the cylindrical dielectric substance 25 is formed with the quartz glass, borosilicate glass, high silicate glass, aluminosilicate glass, ceramics, and the like.

The electrode film layer 26 is formed by causing gold, silver, copper, stainless steel, chromium, tin, zinc, nickel carbon, or aluminum to be subjected to sputtering, thermal spraying, vapor deposition, electroless plating, electrolytic plating, paint application, and the like.

In the configuration described above, the discharge gap length d corresponding to a distance of the discharge gap length d is set to be 0.3 mm to 0.5 mm that is smaller than 0.6 mm, which is a discharge gap length of a common ozone generating apparatus known in the art.

Next, the following describes in detail a method of forming a projection 31 on the metal electrode 18 to set the gap length d=0.30 mm to 0.50 mm.

The following mainly describes a case of the discharge gap length d=0.40 mm in which the yield of ozone is higher within a range of the discharge gap length d based on an experiment result.

To form the metal electrode 18 according to the embodiment, for example, four convex projections 31 are formed on an inner peripheral surface of a stainless steel tube.

Then a diameter D of an inscribed circle inscribed in distal ends of the four projections 31 is caused to be slightly larger than a diameter of the dielectric electrode 17 serving as a discharge tube. As a result, when the cylindrical dielectric electrode 17 is inserted into the metal electrode 18, the discharge gap length d is caused to be a desired value (0.4 mm in the example above) due to the four projections 31.

Hereinafter, processing for forming the projections 31 on the stainless steel tube constituting the metal electrode 18 is referred to as spacing.

As described above, the dielectric electrode 17 is a tubular (test tube shape) dielectric substance (glass or ceramic) the inner peripheral surface (inner side) of which has the formed electrode film layer 26.

Figure 3A:
FIG. 3A is a diagram illustrating a machining dimension of a dielectric electrode according to the embodiment.

FIG. 3A is a diagram illustrating a machining dimension of the dielectric electrode.

Figure 3B:
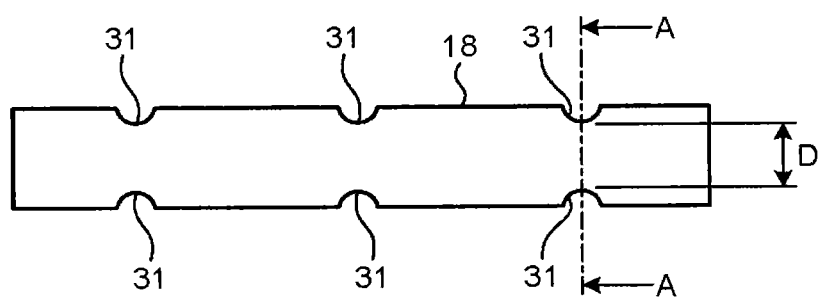
FIG. 3B is a diagram illustrating a machining dimension of a metal electrode on which a projection is formed according to the embodiment.

FIG. 3B is a diagram illustrating a machining dimension of the metal electrode on which the projection is formed.

Figure 3C:
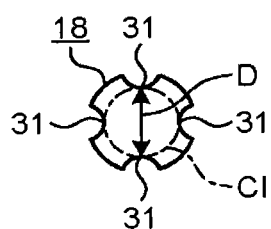
FIG. 3C is a sectional view along the line A-A in FIG. 3B according to the embodiment.

FIG. 3C is a sectional view along the line A-A in FIG. 3B.

Figure 3D:
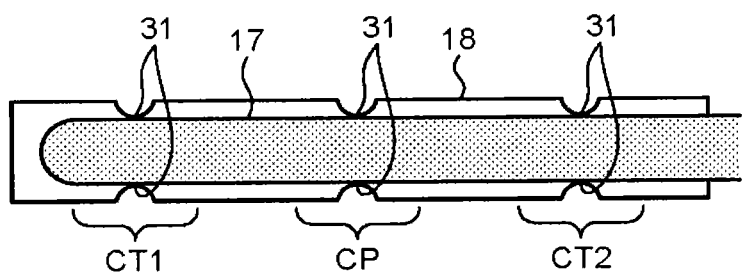
FIG. 3D is an explanatory diagram of a state in which the dielectric electrode is inserted into the metal electrode according to the embodiment.

FIG. 3D is an explanatory diagram of a state in which the dielectric electrode is inserted into the metal electrode.

For easy understanding, in FIGS. 3B to 3D, the projection 31 is exaggerated with respect to the diameter of the stainless steel tube serving as the metal electrode 18.

As illustrated in FIG. 3A, an outer diameter of the dielectric electrode (discharge tube) 17 is assumed to be $D_1$, and the dielectric electrode 17 is assumed to have variation of ±0.15 mm in manufacturing.

A gap between the distal end of the projection 31 and the dielectric electrode 17 inserted into the metal electrode 18 is assumed to be α. To enable all of manufactured dielectric electrodes 17 to be inserted into the metal electrode 18 considering the variation in manufacturing, the metal electrode 18 including the projection 31 needs to be processed so that the diameter D of an inscribed circle Cl inscribed in the distal ends of all of the projections 31 satisfies the expression (1) as illustrated in FIGS. 3B and 3C.

$$D = (D_1 + 0.15) + \alpha \text{ [mm]} \quad (1)$$

When the dielectric electrode 17 is inserted into the metal electrode 18 processed as described above, the discharge gap length d at a center portion CP in the longitudinal direction is within a design range as illustrated in FIG. 3D even if the metal electrode 18 or the dielectric electrode 17 is bent as assumed during manufacturing.

Next, the following describes a method of forming the projection 31.

Figure 4A:
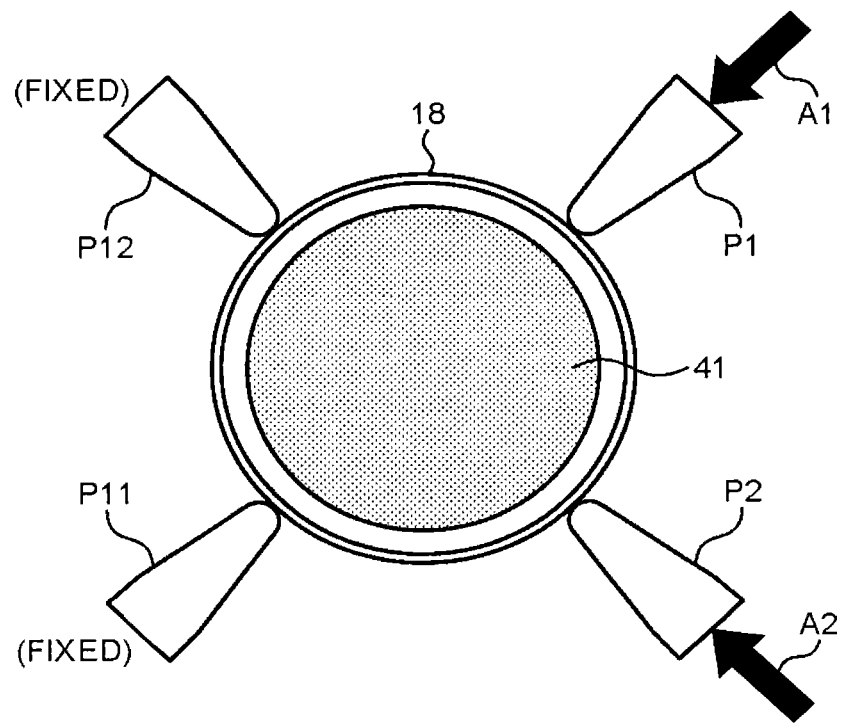
FIG. 4A is a diagram (part 1) for explaining a principle of forming the projection.

FIG. 4A is a diagram (part 1) for explaining a principle of forming the projection.

Figure 4B:
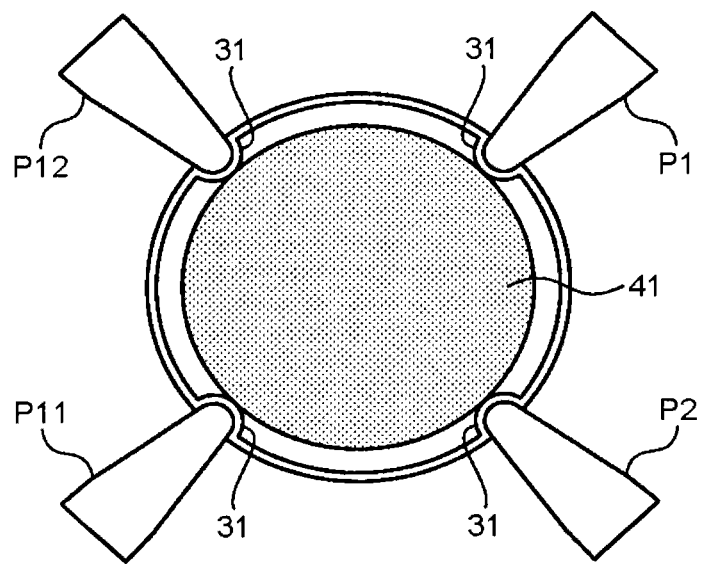
FIG. 4B is a diagram (part 2) for explaining the principle of forming the projection.

FIG. 4B is a diagram (part 2) for explaining the principle of forming the projection.

First, as illustrated in FIG. 4A, a metal mold (quenched steel) 41 is inserted into the stainless steel tube constituting the metal electrode 18. For example, to form four projections 31 on the same circumference, movable punches P1 and P2 are arranged at positions displaced from each other by 90 degrees. Then fixed punches P11 and P12 are arranged at positions opposite to the punches P1 and P2, respectively.

The movable punch P1 is pressed in the arrow A1 direction, and the punch P2 is pressed in the arrow A2 direction.

As a result, all of the punches P1, P2, P11, and P12 are brought into contact with the metal electrode 18. The punches P1 and P2 are then continuously pressed. Thus the projection 31 is gradually formed, and the distal end of the formed projection 31 is caused to collide with the metal mold 41 as illustrated in FIG. 4B.

In this case, dimensions of the metal mold 41 are set considering a return amount after the pressing is stopped. This setting enables a desired height of the projection 31 (for example, 0.40 mm) to be obtained.

The method of forming the projection 31 has been described above. In this case, an important subject is to find an optimum projection 31, that is, to obtain an optimum value for designing the projection 31.

Hereinafter, examined are items that should be considered to obtain the optimum value for designing the projection 31.

In the embodiment, as illustrated in FIGS. 3A to 3D, projection groups each including a plurality of (four in FIG. 3C) projections 31 are arranged at three positions, that is, both ends CT1 and CT2 in the longitudinal direction of the metal electrode 18 and the center portion CP in the longitudinal direction of the metal electrode 18, on the same circumference. That is, twelve (3×4) projections 31 in total are formed for each metal electrode 18.

The embodiment examines three points as follows.

(1) Optimization of Arrangement Position of Each Projection Group in Longitudinal Direction of Metal Electrode When the projection groups are arranged at three positions, that is, both ends CT1 and CT2 in the longitudinal direction of the metal electrode 18 and the center portion CP in the longitudinal direction of the metal electrode 18, the projection group to be arranged at the center portion CP in the longitudinal direction is most preferably arranged at the center of a discharge region.

On the other hand, there is a degree of freedom to select the positions of the projection groups to be arranged at both ends CT1 and CT2 in the longitudinal direction of the metal electrode 18 (distances from both ends of the discharge region).

In contrast, the discharge gap length d may be different from the height of the projection 31 at a place away from the position with which the projection 31 is in contact. In particular, when the metal electrode 18 or the dielectric electrode 17 is bent, the discharge gap length d is different from the height of the projection 31.

Thus even when the metal electrode 18 or the dielectric electrode 17 is bent, it is considered that the projection group can be positioned so that a difference between the discharge gap length d and the height of the projection 31 becomes minimum, and an optimum arrangement position for each projection group in the longitudinal direction of the metal electrode 18 is examined.

(2) Optimization of a Space Between Distal End of Projection and Dielectric Electrode If the dielectric electrode 17 or the metal electrode 18 is bent, the dielectric electrode 17 and the metal electrode 18 are elastically deformed when the dielectric electrode 17 is inserted into the metal electrode 18.

As a result, a reaction force is generated at the projection 31. The reaction force generated at the projection 31 causes a frictional force to be generated when the dielectric electrode 17 is inserted into the metal electrode 18. In this case, to reduce the frictional force, the diameter D of the inscribed circle Cl (refer to FIG. 3C) inscribed in the distal ends of the projections 31 needs to be slightly larger than the diameter $D_1$ of the dielectric electrode 17. If the diameter D of the inscribed circle Cl is increased too much, the discharge gap length d is changed, so that there is an upper limit to the diameter D.

Thus the following examines an optimum value of an increasing amount (a space between the distal end of the projection and the discharge tube) when the diameter D of the inscribed circle Cl is caused to be slightly larger than the diameter $D_1$ of the dielectric electrode 17.

(3) Optimization of the Number of Projections

As described above, in the embodiment, one projection group includes four projections 31. At least three projections need to be provided to coaxially hold the dielectric electrode 17 in the metal electrode 18. The upper limit to the number of projections depends on the dimensions of the metal electrode 18. If the number thereof is too many, cost performance in processing is reduced.

In view of an insertion frictional force of the dielectric electrode 17 when the dielectric electrode 17 or the metal electrode 18 is bent, the optimum value for the number of projections 31 is examined within a range of 3 to 10.

First, the following examines optimization of the arrangement position of each projection group in the longitudinal direction of the metal electrode.

Figure 5A:
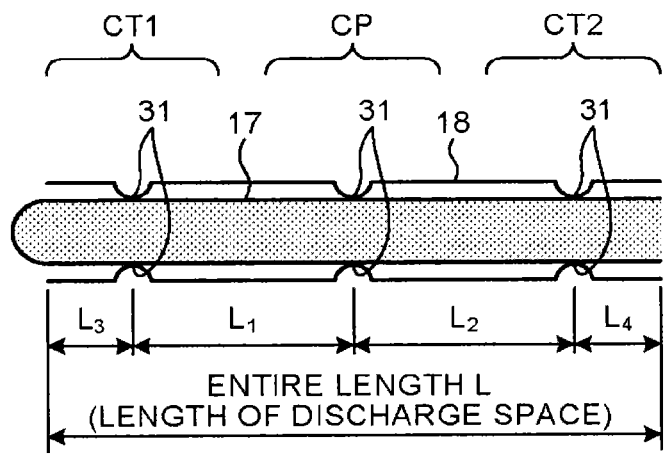
FIG. 5A is an explanatory diagram (part 1) of a model to be examined in optimizing an arrangement position of each projection group in a longitudinal direction of the metal electrode according to the embodiment.

FIG. 5A is an explanatory diagram (part 1) of a model to be examined in optimizing the arrangement position of each projection group in the longitudinal direction of the metal electrode.

Figure 5B:
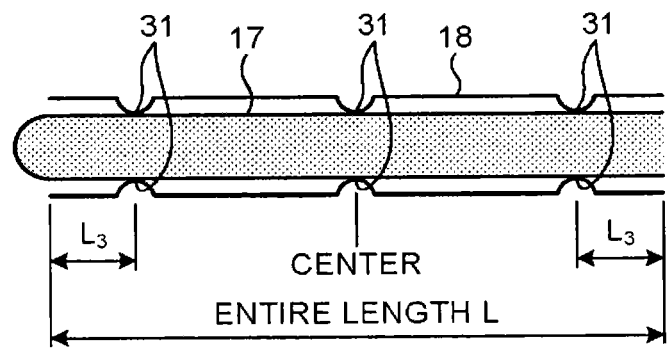
FIG. 5B is an explanatory diagram (part 2) of a model to be examined in optimizing the arrangement position of each projection group in the longitudinal direction of the metal electrode according to the embodiment.

FIG. 5B is an explanatory diagram (part 2) of a model to be examined in optimizing the arrangement position of each projection group in the longitudinal direction of the metal electrode.

In the embodiment, as described above, the projection groups are arranged at three positions, that is, both ends CT1 and CT2 in the longitudinal direction of the metal electrode 18 and the center portion CP in the longitudinal direction of the metal electrode 18.

The optimization of the arrangement position of each projection group in the longitudinal direction of the metal electrode 18 means obtaining optimum values of lengths $L_1$, $L_2$, $L_3$, and $L_4$ in FIGS. 5A and 5B.

In this case, $L_1=L_2$ and $L_3=L_4$ are satisfied according to symmetry, so that a supporting point of the center portion in the longitudinal direction is the center of a discharging space. Accordingly, an unknown quantity is only $L_3$ (=$L_4$), so that a problem is to obtain a ratio between the length $L_3$ and the entire length L.

The following discusses bending of the dielectric electrode 17 and the metal electrode 18.

Figure 6A:
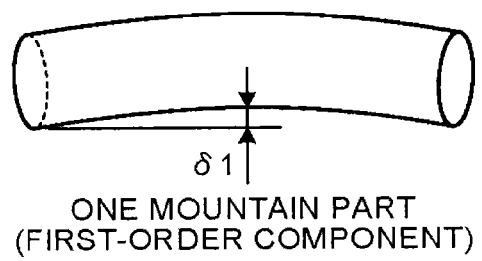
FIG. 6A is an explanatory diagram of a bent state of the dielectric electrode and the metal electrode having one mountain part according to the embodiment.

FIG. 6A is an explanatory diagram of a bent state of the dielectric electrode and the metal electrode having one mountain part.

Figure 6B:
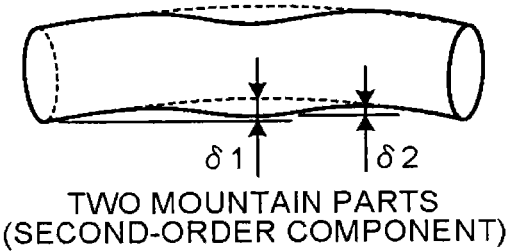
FIG. 6B is an explanatory diagram of a bent state of the dielectric electrode and the metal electrode having two or more mountain parts according to the embodiment.

FIG. 6B is an explanatory diagram of a bent state of the dielectric electrode and the metal electrode having two or more mountain parts.

The dielectric electrode 17 and the metal electrode 18 are commonly more or less bent. Empirically, most bent states have one mountain part (first-order component). On the other hand, the bent state having two or more mountain parts (second-order or higher order component) is hardly present. Assuming that a bending degree in a case of one mountain part is amplitude δ1 and a bending degree in a case of two mountain parts is amplitude δ2, the following expression is satisfied.

δ1>>δ2

In general, the following expression is satisfied.

δn>>δn+1

Assuming that a bending component is called an n-th component when the number of mountain parts is n in the bent state, the empirical rule described above can be rewritten as follows: "the amplitude δ2 of the second-order component is smaller than the amplitude δ1 of the first-order component". According to the empirical rule, the amplitude δ1 as the first-order component of the mountain part is the largest. A bent tube generally has the first-order component (amplitude δ1) to the n-th component (δn).

However, practically, the first-order component of bending (corresponding to the amplitude δ1) is so large as to govern the entire bending as illustrated in FIG. 6B. So components of second-order or higher order (including the amplitude δ2) are negligible.

If a tube having two or more mountain parts is observed at a very low rate, the tube simply does not have the first-order component (amplitude δ1) of bending. The second-order component (amplitude δ2) is originally smaller than the first-order component as described above, so that influence thereof on unevenness of the discharge gap length d is considered to be small.

Accordingly, the embodiment will be examined assuming that the bending of the tube has "one mountain part".

First, described is what will happen if the length $L_3$ is inappropriate.

Figure 7A:
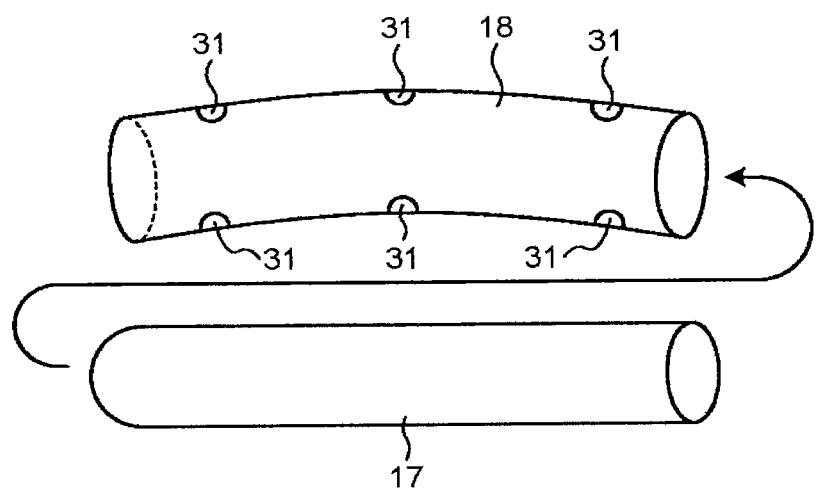
FIG. 7A is an explanatory diagram of a state of the metal electrode before the dielectric electrode is inserted thereto according to the embodiment.

FIG. 7A is an explanatory diagram of a state of the metal electrode before the dielectric electrode is inserted thereto.

Figure 7B:
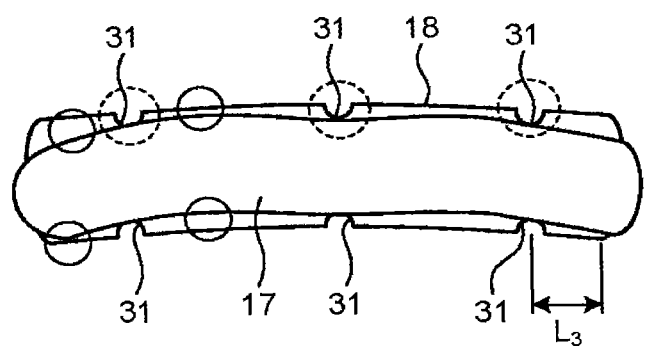
FIG. 7B is an explanatory diagram of a state of a discharge gap when the dielectric electrode is inserted into the metal electrode that is bent according to the embodiment.

FIG. 7B is an explanatory diagram of a state of the discharge gap when the dielectric electrode is inserted into the metal electrode that is bent.

When the metal electrode 18 is in a bent state as illustrated in FIG. 7A and the dielectric electrode 17 is inserted into the metal electrode 18 as it is, the state illustrated in FIG. 7B is obtained.

That is, as represented by a dashed-line circle in FIG. 7B, the discharge gap length d is equal to the height of the projection 31 at a portion where the dielectric electrode 17 is in contact with the projection 31. On the other hand, the discharge gap length d is different from the height of the projection 31 at a portion where the dielectric electrode 17 is not in contact with the projection 31 as represented by a solid-line circle.

In this case, a difference between the discharge gap length d and the height of the projection 31 at each portion where the dielectric electrode 17 is not in contact with the projection 31 is called a deviation amount. A degree of the deviation amount depends on the length (distance) $L_3$ from an end of the discharging space corresponding to a position at which the projection 31 is formed.

As a product design, the length (distance) $L_3$ needs to be obtained so that the deviation amount of the discharge gap length d is minimized.

More specific examination will be provided.

In the following, each of the dielectric electrode 17 and the metal electrode 18 is treated as a tube (pipe) to obtain the deviation amount and an optimum position of the projection 31 where the deviation amount is minimized using a finite element method.

In this case, according to calculation, only sections of the dielectric electrode 17 and the metal electrode 18 are considered, and are treated as a straight line and a curved line represented by a function y=f(x), respectively.

An amount by which the curved line represented by the function y=f(x) is separated from the straight line is called a "warping amount".

The warping amount y caused by bending the metal electrode 18 is represented as a function f(x) in the length direction of the metal electrode 18, the function f(x) representing an actual bending manner of the metal electrode can be varied.

Hereinafter, a case of a parabola and a case of a sine curve will be examined as representatives.

(A) Case of Parabola

In a case of the parabola, the function f(x) representing a bending manner of the metal electrode is represented by an expression (2), for example.

$$f(x)=-a(x^2-Lx)+a(L_3^2-L \cdot L_3) \quad (2)$$

where a is a positive value.

When x=$L_3$, the expression (2) will be as follows.

$$f(L_3)=-a(L_3^2-L \cdot L_3)=0 \quad (3)$$

That is, the warping amount at the position of the projection 31 is zero.

The warping amount becomes a maximum value on the positive side when $$x = \frac{L}{2} \quad (4)$$

is satisfied.

$$f\left(\frac{L}{2}\right) = -a\left(\frac{L^2}{4} - L \cdot \frac{L}{2}\right) + a(L_3^2 - L \cdot L_3) \quad (5)$$
$$= -a\left(\frac{L^2}{4} - \frac{L^2}{2}\right) + a(L_3^2 - L \cdot L_3^2)$$
$$= -a\left(-\frac{L^2}{4}\right) + a(L_3^2 - L \cdot L_3^2)$$
$$= \frac{aL^2}{4} + a(L_3^2 - L \cdot L_3)$$
$$= \frac{aL^2}{4} - a(L \cdot L_3 - L_3^2)$$

The warping amount becomes the maximum value on the negative side when x=0 is satisfied.

$$f(0) = a(L_3^2 - L \cdot L_3) \quad (6)$$
$$= -a(L \cdot L_3 - L_3^2)$$

where a>0, and L>$L_3$, so that the following expression is satisfied.

$$L \cdot L_3 - L_3^2 > 0 \quad (7)$$

Accordingly, f(0)<0.

(B) Case of Sine Curve

In a case of sine curve, the function f(x) representing the bending manner of the metal electrode is represented by an expression (8), for example.

$$f(x) = b \cdot \sin\left(\frac{\pi}{2} \cdot \frac{x}{L/2}\right) - b \cdot \sin\left(\frac{\pi}{2} \cdot \frac{L_3}{L/2}\right) \quad (8)$$

When x=$L_3$, $$f(L_3) = b \cdot \sin\left(\frac{\pi}{2} \cdot \frac{L_3}{L/2}\right) - b \cdot \sin\left(\frac{\pi}{2} \cdot \frac{L_3}{L/2}\right) \quad (9)$$

is satisfied. That is, the warping amount at the position of the projection 31 is zero.

The warping amount becomes the maximum value on the positive side when $$x = \frac{L}{2} \quad (10)$$

is satisfied.

$$f\left(\frac{L}{2}\right) = b \cdot \sin\left(\frac{\pi}{2} \cdot \frac{L/2}{L/2}\right) - b \cdot \sin\left(\frac{\pi}{2} \cdot \frac{L_3}{L/2}\right) \quad (11)$$

$$= b - b \cdot \sin\left(\frac{\pi}{2} \cdot \frac{L_3}{L/2}\right)$$

The warping amount becomes the maximum value on the negative side when x=0 is satisfied.

$$f(0) = -b \cdot \sin\left(\frac{\pi}{2} \cdot \frac{L_3}{L/2}\right) \quad (12)$$

Figure 8A:
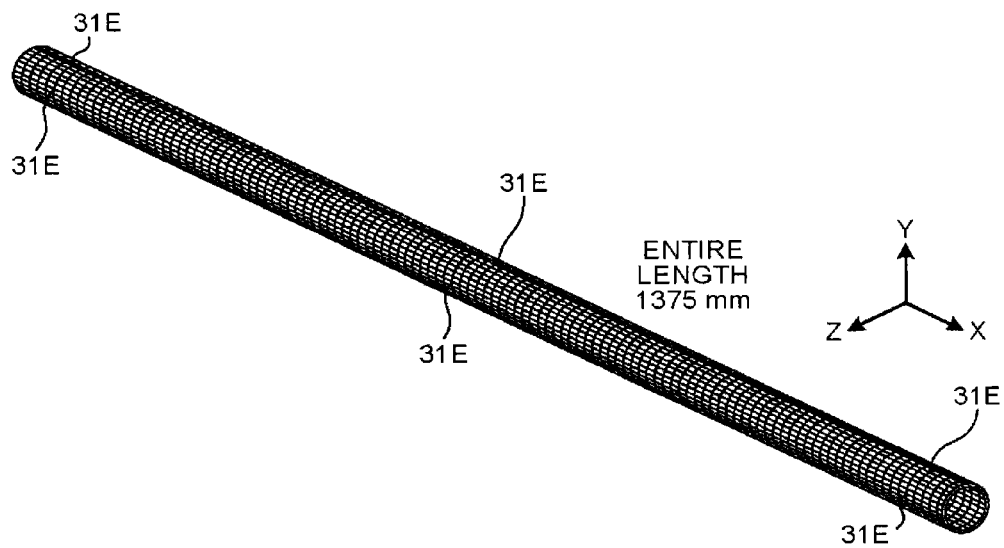
FIG. 8A is an entire view of a finite element method model according to the embodiment.

FIG. 8A is an entire view of a finite element method model.

Figure 8B:
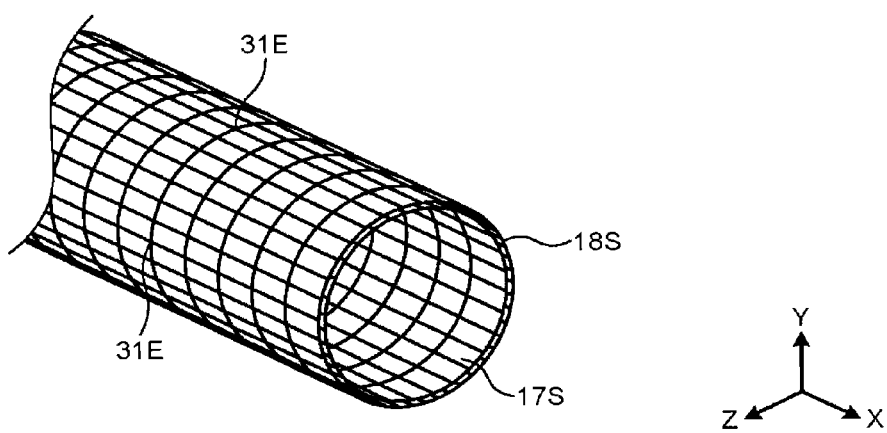
FIG. 8B is an enlarged view of an end of the finite element method model according to the embodiment.

FIG. 8B is an enlarged view of an end of the finite element method model.

Figure 8C:
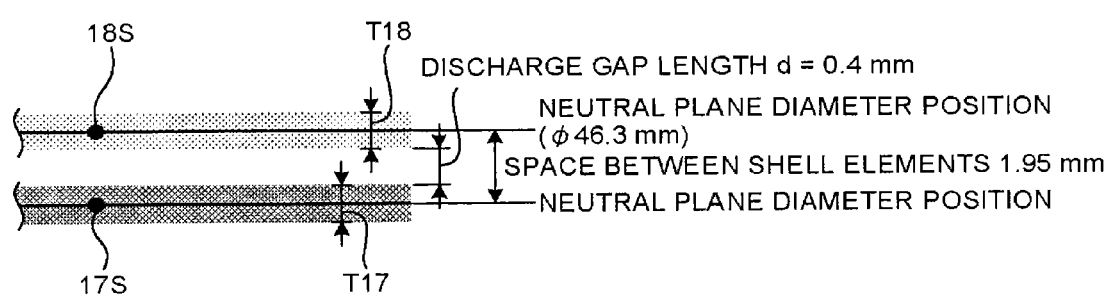
FIG. 8C is a sectional diagram for explaining the finite element method model according to the embodiment.

FIG. 8C is an explanatory diagram of a section of the finite element method model.

In FIGS. 8A to 8C, the dielectric electrode 17 and the metal electrode 18 are modeled with shell elements, and the projection 31 is modeled as a point-surface contact element described later.

In FIGS. 8A to 8C, only the outer metal electrode 18 is assumed to be a tube parabolically warped by 0.50 mm, and the inner dielectric electrode 17 is assumed to be an ideal straight tube.

The dielectric electrode 17 and the metal electrode 18 as tube bodies are modeled with the shell elements, so that a diameter of the tube is a neutral plane with respect to a plate thickness. The dielectric electrode 17 is made of glass, the diameter of the neutral plane=42.4 mm, and the plate thickness T17=1.6 mm. The metal electrode 18 is made of stainless steel, the diameter of the neutral plane=46.3 mm, and the plate thickness T18=1.5 mm.

The discharge gap length d is 0.40 mm.

As a result, the space between the dielectric electrode 17 and the metal electrode 18 in the finite element method model is 1.95 mm considering the plate thickness of the tube as illustrated in FIG. 8C. Accordingly, the gap is 1.95 mm according to numerical analysis. Although an analytic model is a half model being half in longitudinal direction, a symmetric object is also represented in FIG. 8A. FIG. 12 described below also represents the symmetric object.

For the analysis, used is finite element method analysis software ANSYS Ver.13.0 manufactured by Cybernet Systems Co., Ltd.

When the dielectric electrode 17 is in contact with the metal electrode 18, the reaction force is generated between the projection 31 and both the dielectric electrode 17 and the metal electrode 18. However, when the dielectric electrode 17 is not in contact with the metal electrode 18, no force is generated. In the embodiment, the projection 31 is modeled using the point-surface contact element.

Figure 9A:
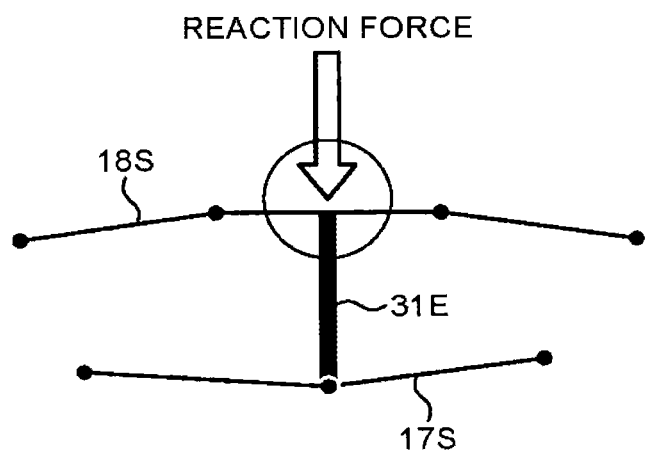
FIG. 9A is an explanatory diagram of a point-surface contact element model when the projection is in contact with the dielectric electrode (contact state) according to the embodiment.

FIG. 9A is an explanatory diagram of a point-surface contact element model when the projection is in contact with the dielectric electrode (contact state).

Figure 9B:
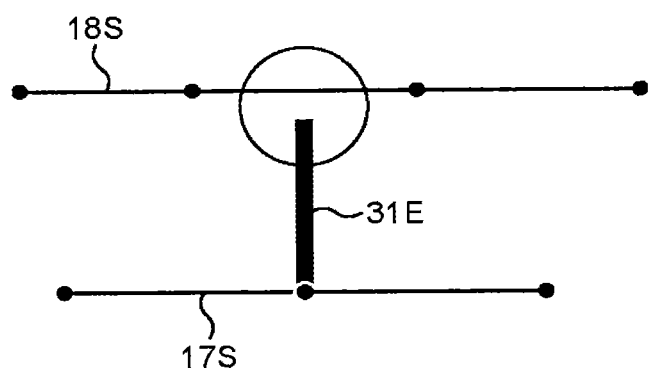
FIG. 9B is an explanatory diagram of the point-surface contact element model when the projection is not in contact with the dielectric electrode (non-contact state) according to the embodiment.

FIG. 9B is an explanatory diagram of the point-surface contact element model when the projection is not in contact with the dielectric electrode (non-contact state).

In the model of FIGS. 9A and 9B, the contact element functions as "brought into contact when the space is 1.95 mm". That is, a length of the contact element can be interpreted to be 1.95 mm.

As illustrated in FIG. 9A, a point-surface contact element 31E corresponding to the projection 31 functions when being in contact with a shell element 17S corresponding to the dielectric electrode 17 or a shell element 18S corresponding to the metal electrode 18. Depending on the generated reaction force, the shell element 17S corresponding to the dielectric electrode 17 or the shell element 18S corresponding to the metal electrode 18 is deformed.

In contrast, when the point-surface contact element 31E corresponding to the projection 31 is not in contact with the shell element 18S corresponding to the metal electrode 18, as illustrated in FIG. 9B, no force is generated between the point-surface contact element 31E corresponding to the projection 31, and the shell element 17S corresponding to the dielectric electrode 17 and the shell element 18S corresponding to the metal electrode 18.

Figure 10A:
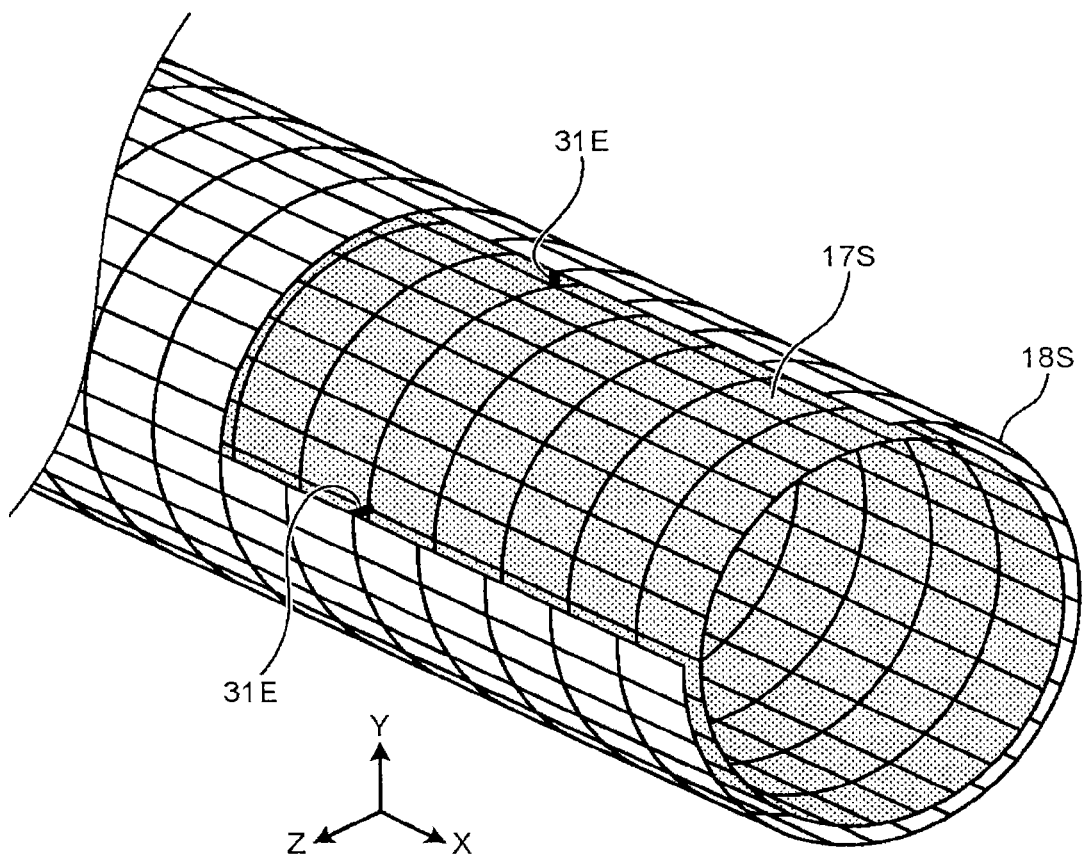
FIG. 10A is an enlarged perspective view of a partially cut finite element method model according to the embodiment.

FIG. 10A is an enlarged perspective view of a partially cut finite element method model.

Figure 10B:
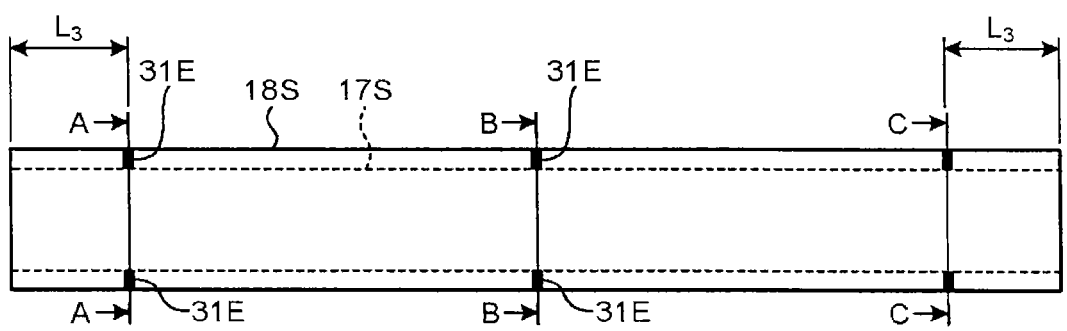
FIG. 10B is an explanatory diagram of an arrangement of a point-surface contact element according to the embodiment.

FIG. 10B is an explanatory diagram of an arrangement of the point-surface contact element.

Figure 10C:
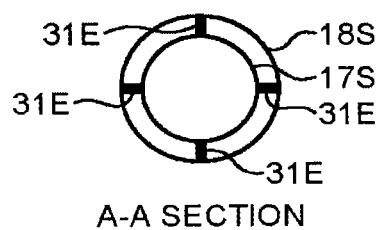
FIG. 10C is a sectional view along the line A-A in FIG. 10B according to the embodiment.

FIG. 10C is a sectional view along the line A-A in FIG. 10B.

Figure 10D:
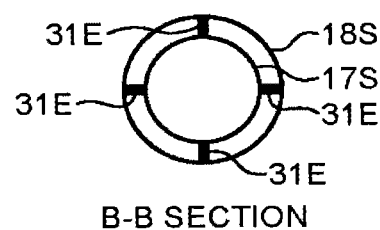
FIG. 10D is a sectional view along the line B-B in FIG. 10B according to the embodiment.

FIG. 10D is a sectional view along the line B-B in FIG. 10B.

Figure 10E:
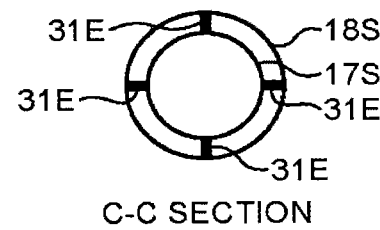
FIG. 10E is a sectional view along the line C-C in FIG. 10B according to the embodiment.

FIG. 10E is a sectional view along the line C-C in FIG. 10B.

In FIGS. 10A to 10E, the position of the point-surface contact element 31E corresponds to the position at which the projection 31 is arranged.

In the embodiment, four point-surface contact elements 31E corresponding to the projections 31 are arranged at pitches of 90 degrees on the same circumference of positions away from both ends of the shell element corresponding to the dielectric electrode 17 or the metal electrode 18 by a distance $L_3$ (corresponding to the A-A section and the C-C section, respectively), and the center position (corresponding to the B-B section).

Figure 11A:
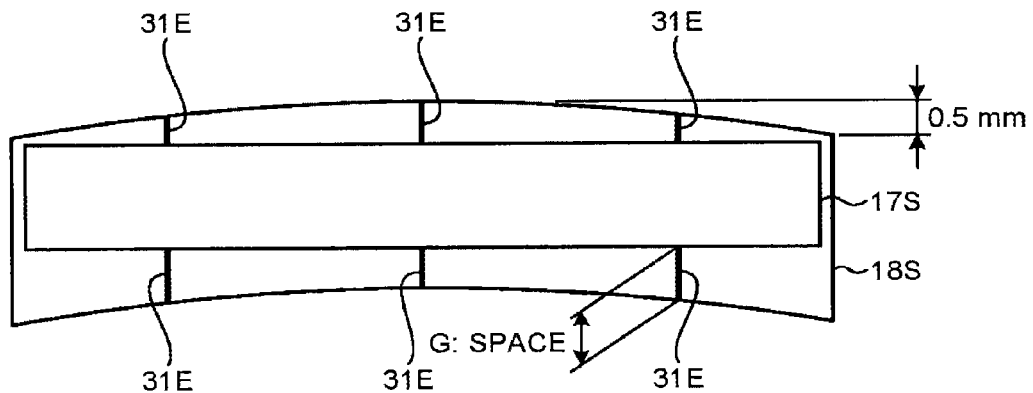
FIG. 11A is an explanatory diagram (part 1) of an analysis state using the finite element method model according to the embodiment.

FIG. 11A is an explanatory diagram (part 1) of an analysis state using the finite element method model.

Figure 11B:
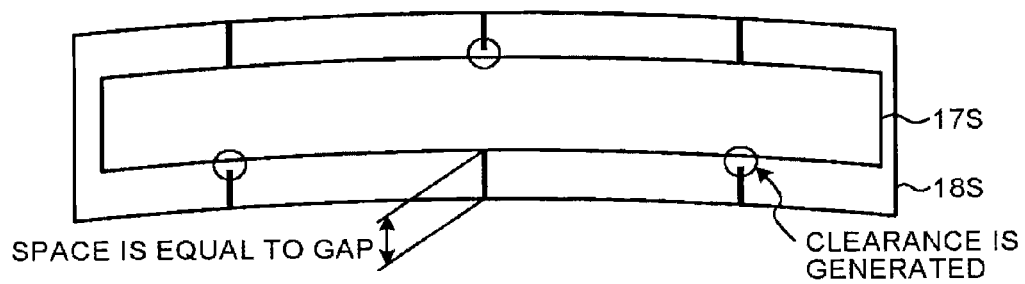
FIG. 11B is an explanatory diagram (part 2) of the analysis state using the finite element method model according to the embodiment.

FIG. 11B is an explanatory diagram (part 2) of the analysis state using the finite element method model.

Figure 11C:
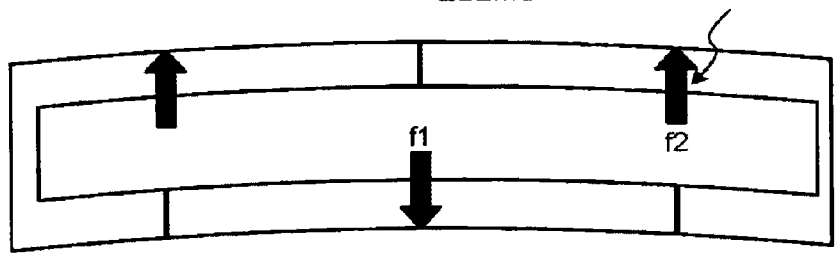
FIG. 11C is an explanatory diagram (part 3) of the analysis state using the finite element method model according to the embodiment.

FIG. 11C is an explanatory diagram (part 3) of the analysis state using the finite element method model.

In this case, no external force is applied to the finite element method model.

Accordingly, as illustrated in FIG. 11A, when the dielectric electrode 17 as a straight tube is inserted into the metal electrode 18 parabolically warped by 0.50 mm, the metal electrode 18 and the dielectric electrode 17 interfere with each other due to the projection 31 (=point-surface contact element 31E).

More specifically, as illustrated in FIG. 11B, when the dielectric electrode 17 is forcibly inserted into the metal electrode 18, the shell element 17S corresponding to the dielectric electrode 17 and the shell element 18S corresponding to the metal electrode 18 are elastically deformed so as to keep the state in which the dielectric electrode 17 is in contact with the metal electrode 18 via the projection 31. That is, the shell element 17S corresponding to the dielectric electrode 17 and the shell element 18S corresponding to the metal electrode 18 are elastically deformed so that a space G of the point-surface contact element 31E in the finite element method model becomes 1.95 mm.

Then deformation amounts of the shell element 17S corresponding to the dielectric electrode 17 and the shell element 18S corresponding to the metal electrode 18 during elastic deformation are obtained. At the same time, a reaction force generated at the point-surface contact element corresponding to the projection 31 is obtained.

As illustrated in FIG. 11C, a frictional force is predicted based on the obtained reaction force.

Figure 12A:
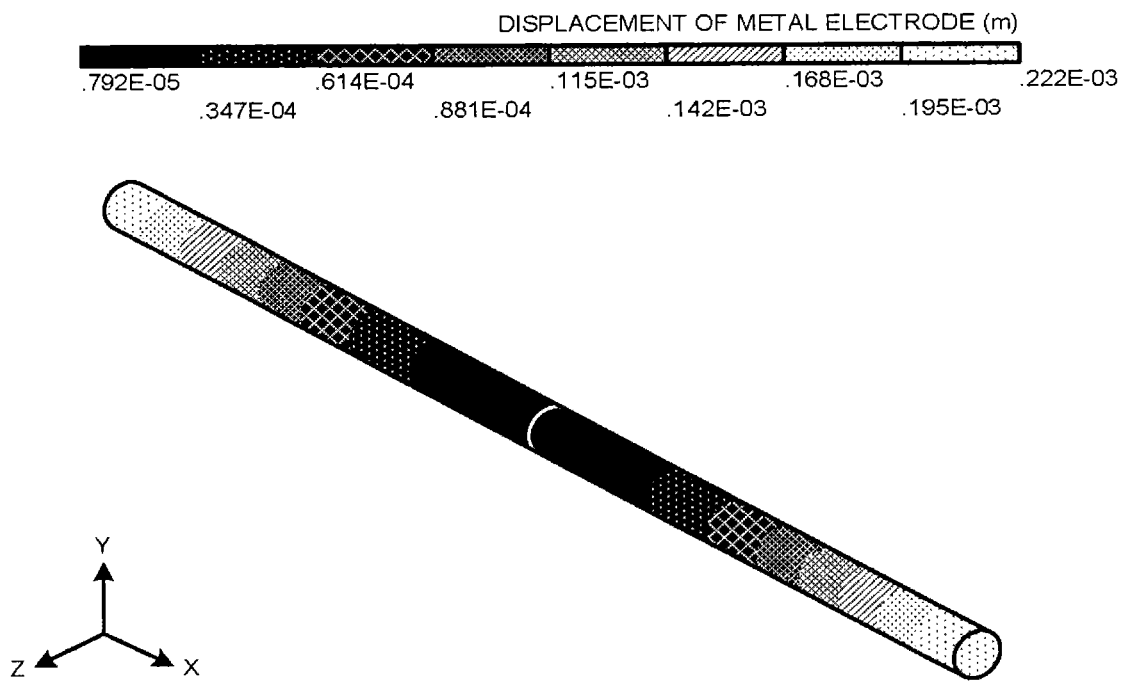
FIG. 12A is an explanatory diagram of a displacement amount in the Y-direction of a metal electrode 18 according to the embodiment.

FIG. 12A is an explanatory diagram of a displacement amount in the Y-direction of the metal electrode 18.

Figure 12B:
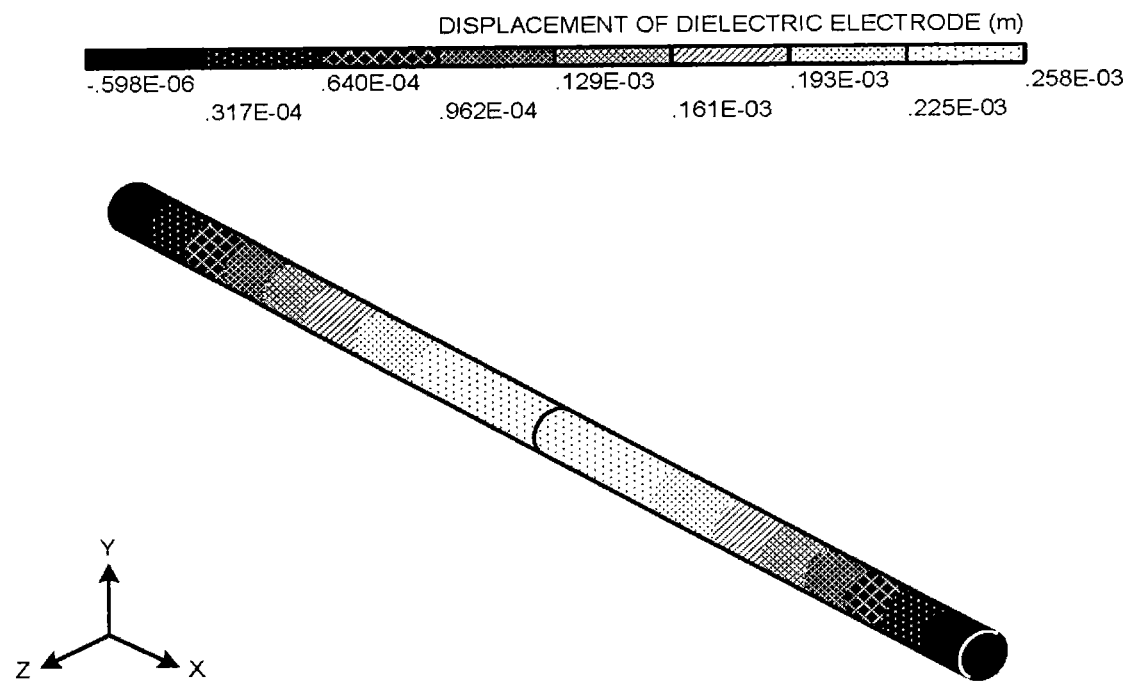
FIG. 12B is an explanatory diagram of the displacement amount in the Y-direction of a dielectric electrode 17 according to the embodiment.

FIG. 12B is an explanatory diagram of the displacement amount in the Y-direction of the dielectric electrode 17.

The Y-direction means a direction in which the metal electrode 18 (and the shell element 18S corresponding to the metal electrode 18) is warped.

In the analysis using the finite element method model, the dielectric electrode 17 and the metal electrode 18 are treated as elastic bodies according to a Young's modulus corresponding to each material. So the dielectric electrode 17 and the metal electrode 18 are deformed according to each Young's modulus and each shape (the diameter and the plate thickness).

Specifically, as illustrated in FIG. 12A, the metal electrode 18 is bent in a direction along which warpage is reduced. On the other hand, as illustrated in FIG. 12B, the dielectric electrode 17 is bent in a direction along which the warpage is increased.

Then reaction forces f1 and f2 caused by the warpage thereof are balanced as a whole.

Next, the following describes a method of obtaining deviation amounts a1 and a2.

The deviation amount a1 represents a deviation amount between the center and the projection 31 arranged at the position away from the end by $L_3$. The deviation amount a2 represents a deviation amount between the end and the projection 31 arranged at the position away from the end by $L_3$.

FIG. 13 is a partially cut sectional perspective view of the finite element method model.

The displacement amount of each node is obtained from the analysis using the finite element method model.

An upper gap UG and a lower gap LG after deformation illustrated in FIG. 13 are obtained from node coordinates and the displacement amount.

Figure 14:
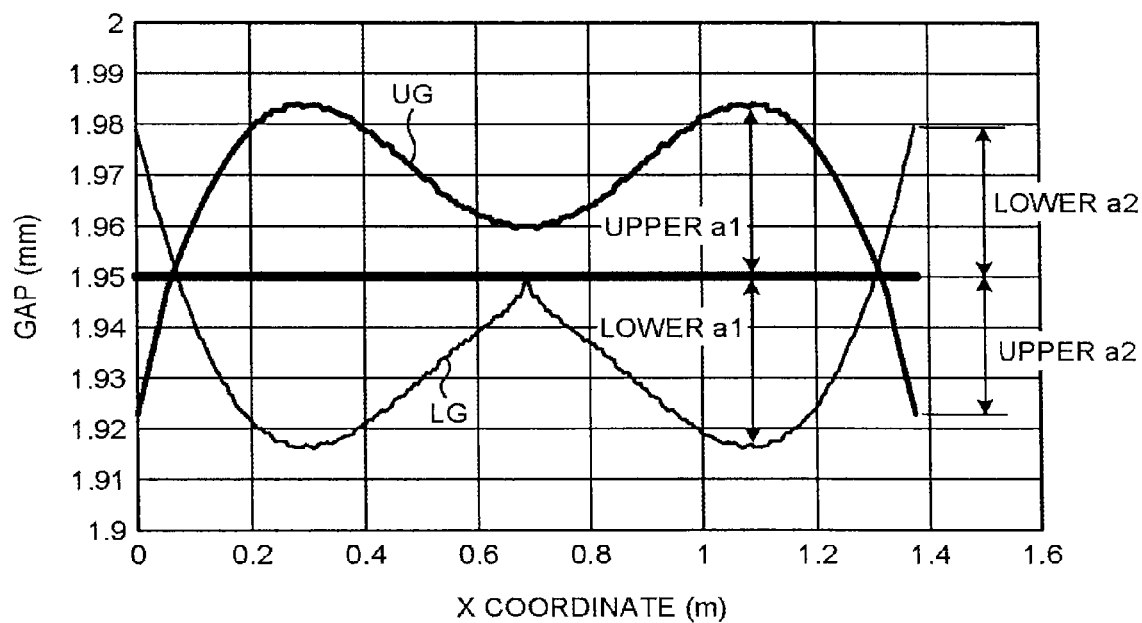
FIG. 14 is an explanatory diagram of a deviation amount according to the embodiment.

FIG. 14 is an explanatory diagram of the deviation amount.

In FIG. 14, a length of a discharge region in the metal electrode 18 is assumed to be 1.375 m (1375 mm).

There are four types of deviation amounts a1 and a2 in total, two types being caused by the upper gap UG and the other two types being caused by the lower gap LG.

First, the maximum deviation amount c is selected from among the upper deviation amounts a1 and a2 and the lower deviation amounts a1 and a2.

In this case, the maximum deviation amount c is changed corresponding to the length $L_3$.

Accordingly, the length $L_3$ by which the maximum deviation amount c is minimized is the optimum value for a projection position.

Figure 15:
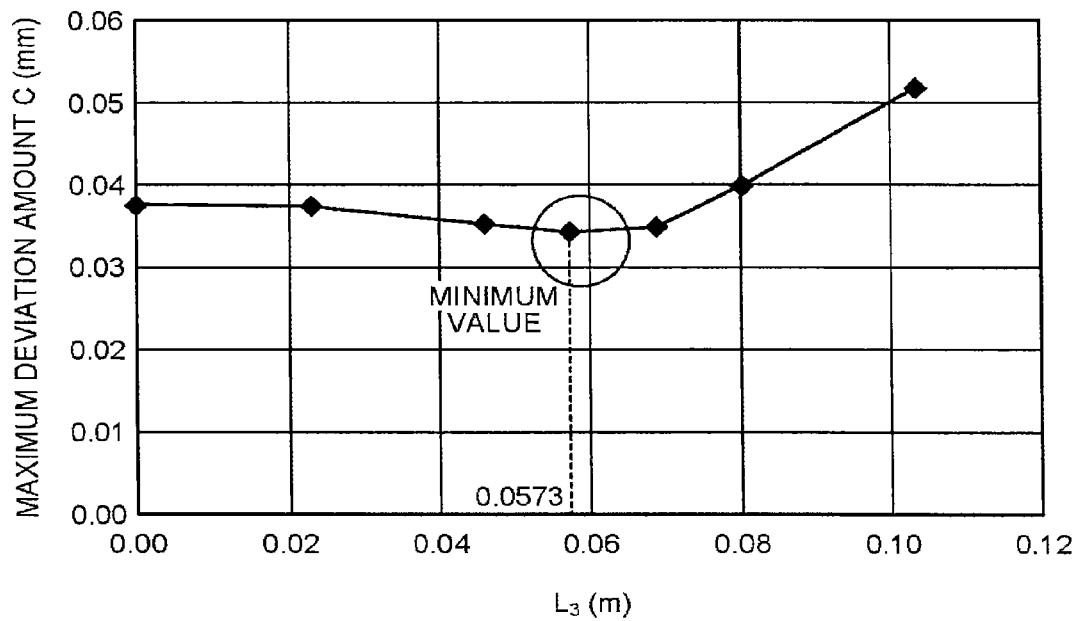
FIG. 15 is an explanatory diagram of a relation between a length $L_3$ and a maximum deviation amount according to the embodiment.

FIG. 15 is an explanatory diagram of a relation between the length $L_3$ and the maximum deviation amount.

In the case of the example in FIG. 15, when the length $L_3$=0.0573 m (57.3 mm), that is, when $L_3/L$=0.042, the maximum deviation amount c is minimized. Accordingly, this value is the optimum value for the length $L_3$, that is, the optimum value of the projection position.

A practical optimum range of the length $L_3$, that is, the position of the projection 31 is within a range of $L_3/L$=0.04 to 0.06 as a result of varying conditions.

The above description is about a case in which the metal electrode 18 is parabolically bent. Next, the following examines the optimum value of the position at which the projection 31 is formed when the metal electrode 18 is bent in a sine-curved shape.

Herein, the expression f(x) representing a bent state of the metal electrode 18 is represented as the expression (8) as described above.

Similarly to the method described above, the deviation amount from a target value of the discharge gap length d is obtained using the finite element method model of the metal electrode 18, and the practical optimum range of the length $L_3$ is calculated based on a relation between the length $L_3$ and the maximum deviation amount.

Figure 16:
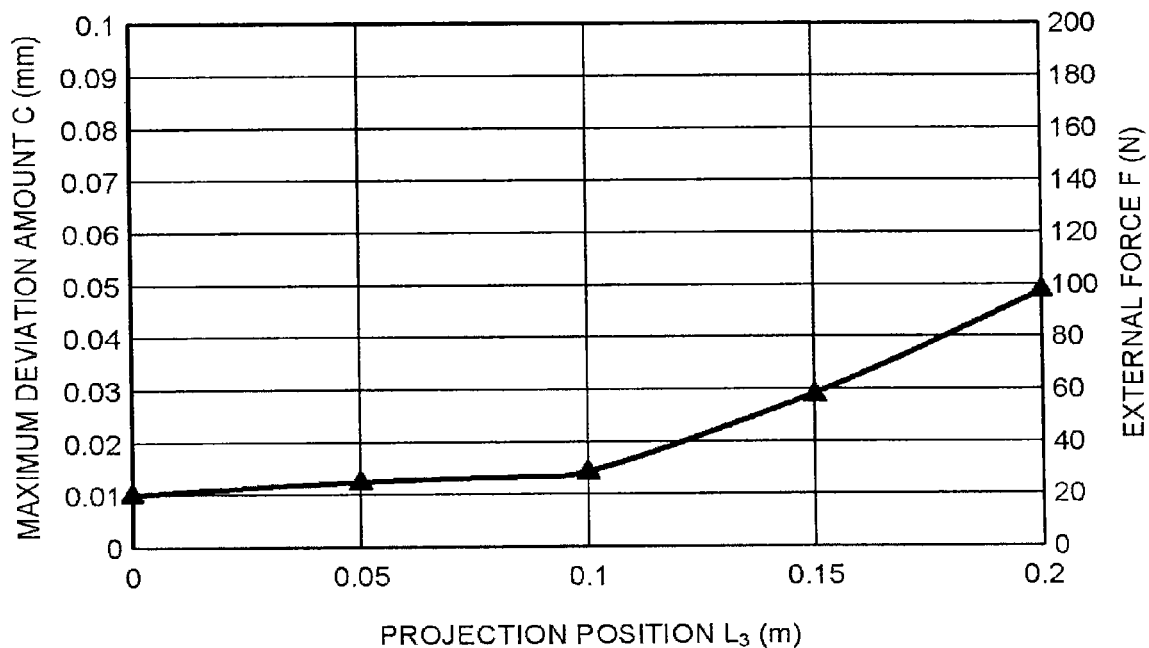
FIG. 16 is an explanatory diagram of a relation between the length $L_3$ and the maximum deviation amount when the metal electrode is bent in a sine-curved shape according to the embodiment.

FIG. 16 is an explanatory diagram of a relation between the length $L_3$ and the maximum deviation amount when the metal electrode is bent in a sine-curved shape.

As illustrated in FIG. 16, when the metal electrode 18 is bent in a sine-curved shape, $L_3=0.0$ should be satisfied, that is, the projection position should be at the end to minimize the deviation amount.

The practical optimum range of the length $L_3$, that is, the position of the projection 31 is within a range of $L_3/L=0.0$ to 0.1 as a result of varying conditions.

Next, the following examines optimization of the space between the distal end of the projection 31 and the dielectric electrode 17.

First, the following examines a frictional force when the dielectric electrode 17 is inserted into the metal electrode 18.

If dimensional accuracy of the dielectric electrode 17 or the metal electrode 18 is low, the frictional force may be generated between the dielectric electrode 17 and the metal electrode 18 due to the projection 31 when the dielectric electrode 17 is inserted into the metal electrode 18 on which the projection 31 is arranged, so that the insertion may become difficult.

To pull out the inserted dielectric electrode 17 after generating ozone, much larger force is required as compared with when it is inserted.

It is estimated that oxide powder adhering to a surface of the dielectric electrode 17 causes the above problem.

Examples of an abnormal shape of the metal electrode 18 may include "bending" and "a circular section not being a perfect circle".

However, the dielectric electrode 17 easily passes through the first two projections 31 (projection group), and friction is generated when the dielectric electrode 17 passes through the last projection 31 (constituting the third projection group from an insertion side). Due to this, "bending" is considered to dominate the abnormal shape that influences the insertion of the dielectric electrode 17.

Figure 17A:
FIG. 17A is an explanatory diagram of a state of the dielectric electrode before insertion according to the embodiment.

FIG. 17A is an explanatory diagram of a state of the dielectric electrode before insertion.

Figure 17B:
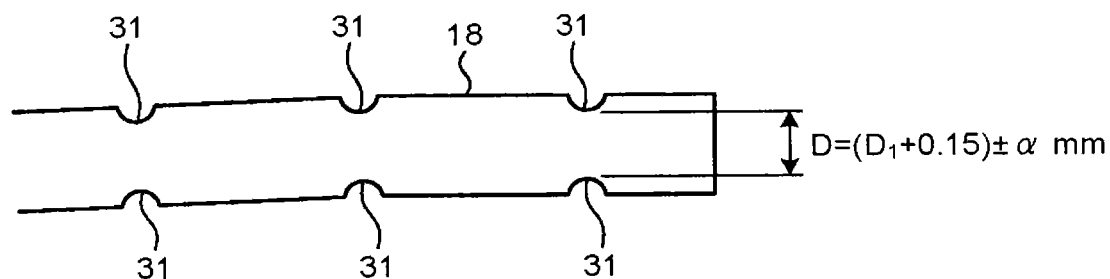
FIG. 17B is an explanatory diagram of a state of the metal electrode before the dielectric electrode is inserted thereto according to the embodiment.

FIG. 17B is an explanatory diagram of a state of the metal electrode before the dielectric electrode is inserted thereto.

Figure 17C:
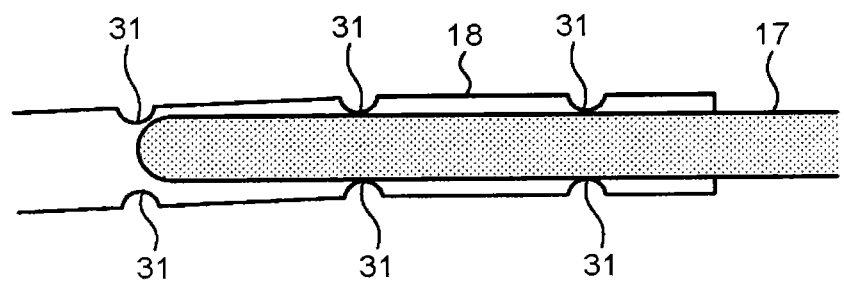
FIG. 17C is an explanatory diagram (part 1) of friction corresponding to bending of the metal electrode when the dielectric electrode is inserted according to the embodiment.

FIG. 17C is an explanatory diagram (part 1) of the friction corresponding to the bending of the metal electrode when the dielectric electrode is inserted.

Figure 17D:
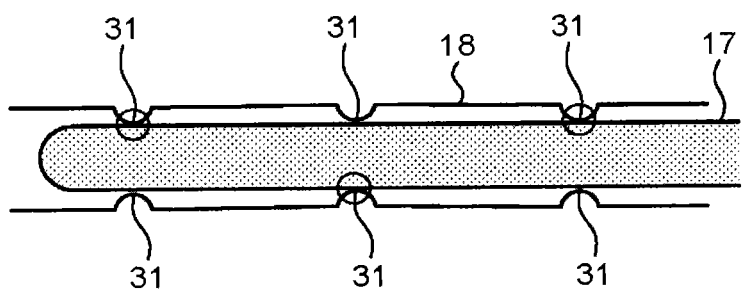
FIG. 17D is an explanatory diagram (part 2) of the friction corresponding to bending of the metal electrode when the dielectric electrode is inserted according to the embodiment.

FIG. 17D is an explanatory diagram (part 2) of the friction corresponding to the bending of the metal electrode when the dielectric electrode is inserted.

When the diameter of the inscribed circle inscribed in the projections 31 arranged on the metal electrode 18 is assumed to be D, a tolerance of an outer diameter of the dielectric electrode 17 is $D_1 \pm 0.15$ mm as illustrated in FIG. 17A.

Accordingly, the outer diameter of the dielectric electrode 17 is assumed to be the upper limit of the tolerance of the outer diameter ($=D_1+0.15$ mm). In this case, the projections 31 are arranged on the metal electrode 18 so that an effective inner diameter of the metal electrode 18, that is, the diameter D of the circle inscribed in the distal ends of one projection group is equal to or larger than $D_1+0.15$ mm as illustrated in FIG. 17B. That is, a value of $\alpha$ in FIG. 17B should be a positive value (plus value).

On the other hand, if $\alpha$ is too large, the discharge gap length d does not become a desired value. From this point of view, the value of $\alpha$ is preferably closer to zero. However, when $\alpha=0$, the frictional force at the time of insertion generated at a circled region illustrated in FIG. 17D is increased as described above.

Here, the lower limit value of a is obtained.

Hereinafter, $\alpha$ is referred to as a projection distal end gap.

In an experimental machine according to the embodiment, the inner diameter formed by the projections 31 for spacing is caused to be within a range of $D_1+0.15$ to $D_1+0.20$ mm.

Specifically, prepared are a cylindrical limit gauge having a size of $D_1+0.15$ mm, and a cylindrical limit gauge having a size of $D_1+0.20$ mm. Then processing of forming the projections 31 on the metal electrode 18 is performed so that the limit gauge of $D_1+0.15$ mm passes through the metal electrode 18, and the limit gauge of $D_1+0.20$ mm passes through the metal electrode 18 with the frictional force or the limit gauge of $D_1+0.20$ mm does not pass through the metal electrode 18.

Figure 18:
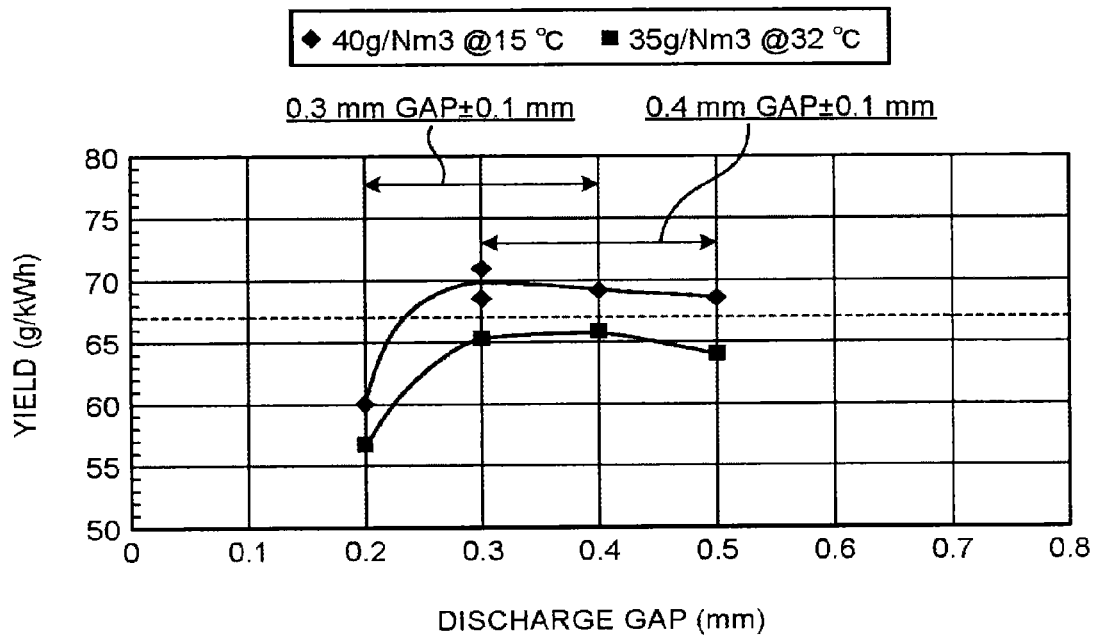
FIG. 18 is a diagram illustrating a relation between the discharge gap and the yield of ozone according to the embodiment.

FIG. 18 is a diagram illustrating a relation between the discharge gap and the yield of ozone.

When variation in the discharge gap is assumed to be ±0.10 mm, it is found that a high yield of ozone can be secured by setting the discharge gap to 0.40 mm.

The height of the projection 31 is a value obtained by subtracting the projection distal end gap $\alpha$ from 0.40 mm.

By using the finite element method model illustrated in FIGS. 8A to 8C while varying the height of the projection 31 (varying the gap of the point-surface contact element 31E), the reaction force (reaction force of the point-surface contact element 31E) generated at the projection 31 is calculated.

As illustrated in FIG. 8C, the gap of the point-surface contact element 31E is 1.95 mm when an actual discharge gap length d is 0.40 mm.

Figure 19:
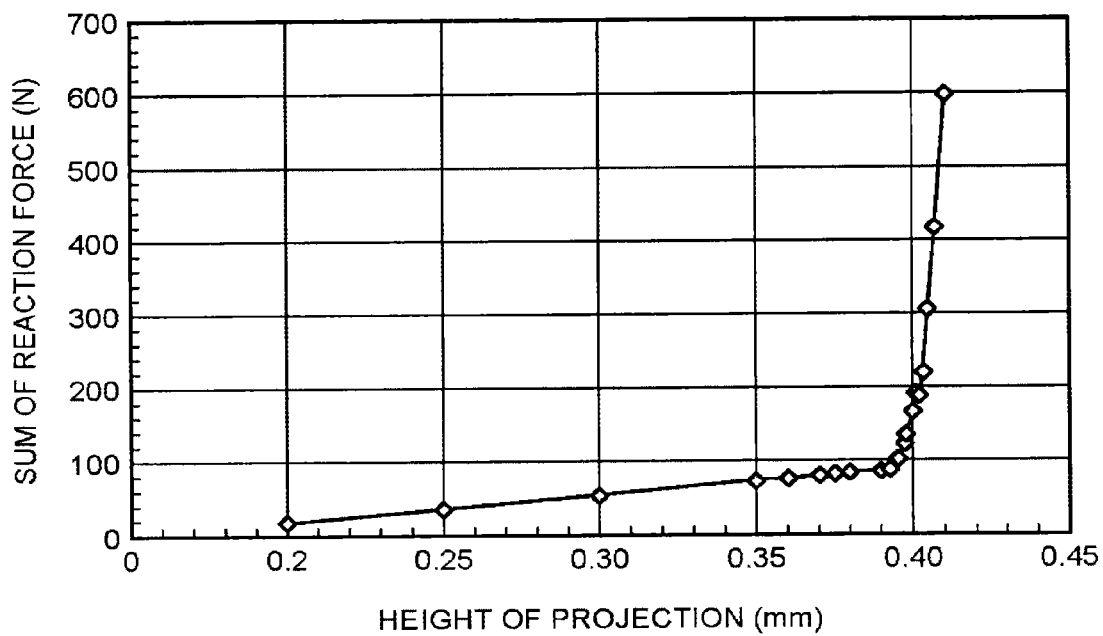
FIG. 19 is a diagram illustrating a total value (N) of a reaction force generated at a projection 31 when the discharge gap length d is changed according to the embodiment.

FIG. 19 is a diagram illustrating a total value (N) of the reaction force generated at the projection 31 when the discharge gap length d is changed.

Figure 20:
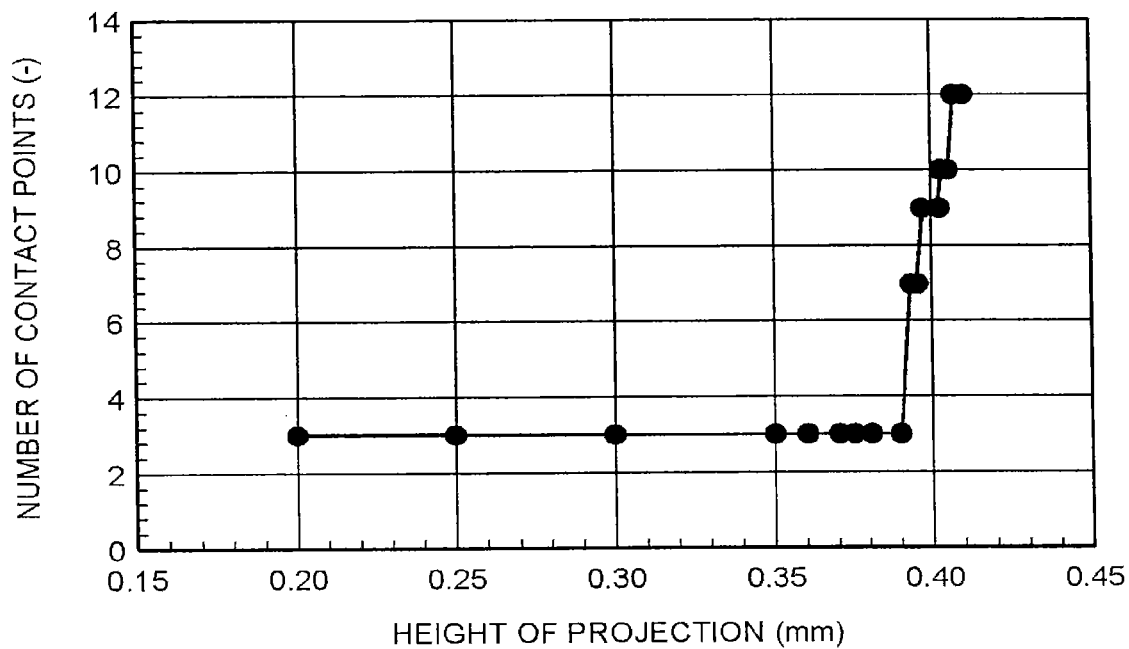
FIG. 20 is an explanatory diagram of a relation between a height of the projection and the number of projections being in contact with the dielectric electrode (the number of contact points) according to the embodiment.

FIG. 20 is an explanatory diagram of a relation between the height of the projection and the number of projections being in contact with the dielectric electrode (the number of contact points).

When the height of the projection 31 is 0.39 mm, the sum of the reaction force is 88.0 N, and the number of contact points is 3.

Figure 21:
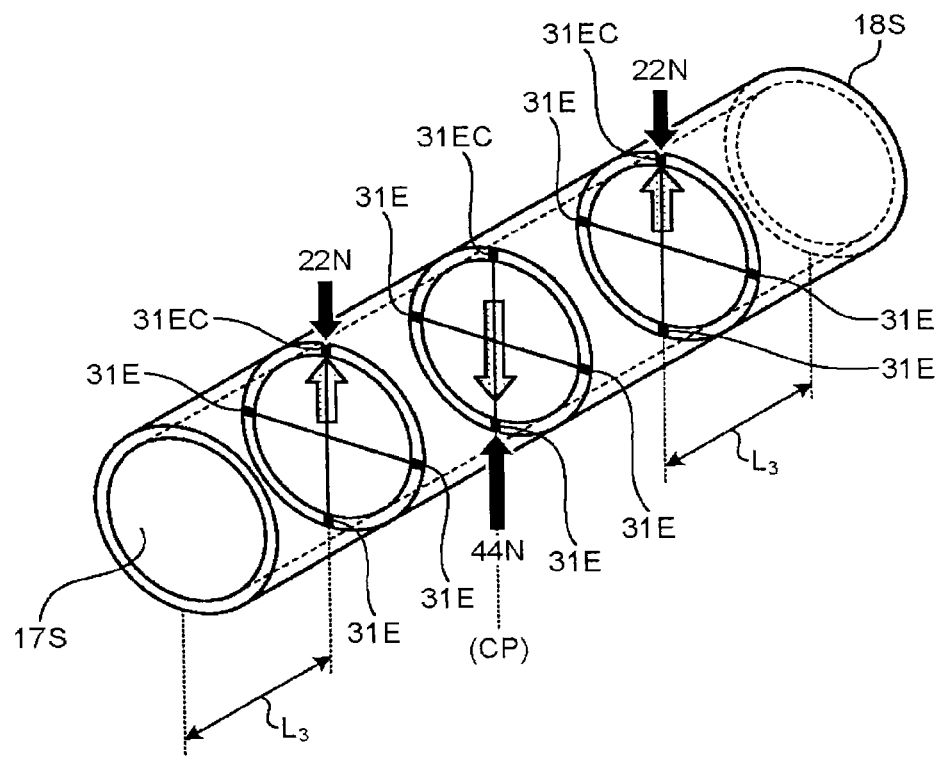
FIG. 21 is an explanatory diagram of a contact state of the projection when the height of the projection=0.39 mm according to the embodiment.

FIG. 21 is an explanatory diagram of a contact state of the projection when the height of the projection=0.39 mm.

As illustrated in FIG. 21, the metal electrode 18 (the projection 31 formed thereon) is in contact with (pressed against) the dielectric electrode 17 at three points.

As a result, the frictional force is generated at a contact portion between the projection 31 and the dielectric electrode 17 when the dielectric electrode 17 is inserted into the metal electrode 18, and a value of the frictional force is obtained by multiplying a frictional coefficient by the total value of the reaction force.

On the other hand, to facilitate the insertion of the dielectric electrode 17 into the metal electrode 18, the total value of the reaction force should be reduced. The discharge gap length d at the contact portion between the projection 31 and the dielectric electrode 17 is equal to the height of the projection. That is, it is 0.39 mm in this example. The discharge gap length d at a non-contact portion is larger than the height of the projection 31 (=0.39 mm).

Here, FIGS. 19 and 20 are referred again.

In FIG. 19, the total value of the reaction force gradually increases until the height of the projection 31=0.39 mm.

However, the total value steeply increases after exceeding the height of the projection 31=0.39 mm. According to FIG. 20, the number of contact points also steeply increases after exceeding the height of the projection=0.39 mm. For example, the number of contact points=12 when the height of the projection 31=0.41 mm. That is, all of the projections 31 are in a contact state.

Figure 22:
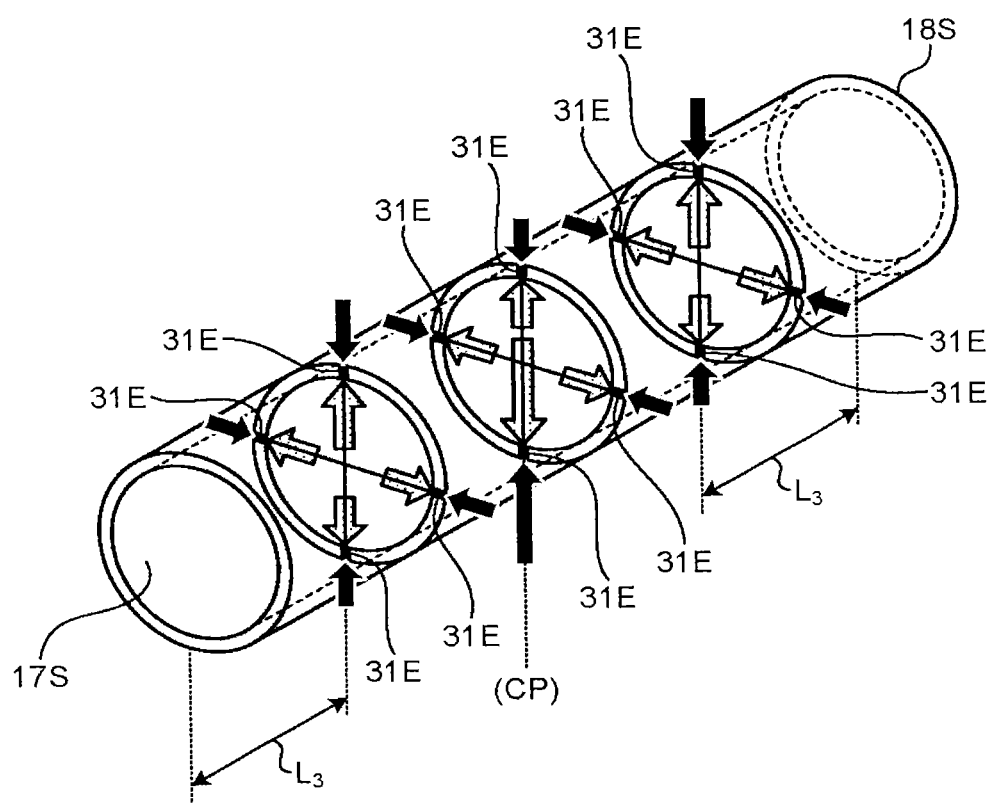
FIG. 22 is an explanatory diagram of the contact state when the height of the projection=0.41 mm according to the embodiment.

FIG. 22 is an explanatory diagram of the contact state when the height of the projection=0.41 mm.

Figure 23A:
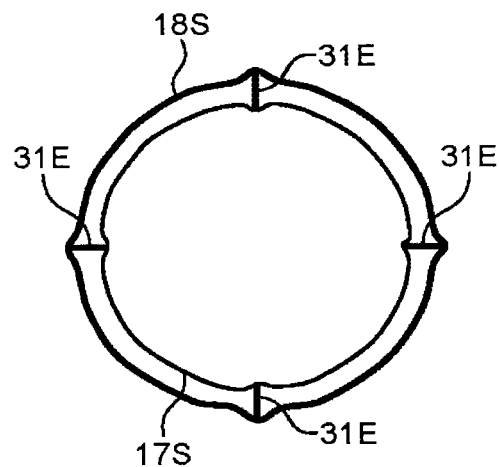
FIG. 23A is an explanatory diagram of a simulation result of the contact state when the height of the projection=0.41 mm according to the embodiment.

FIG. 23A is an explanatory diagram of a simulation result of the contact state when the height of the projection=0.41 mm.

Figure 23B:
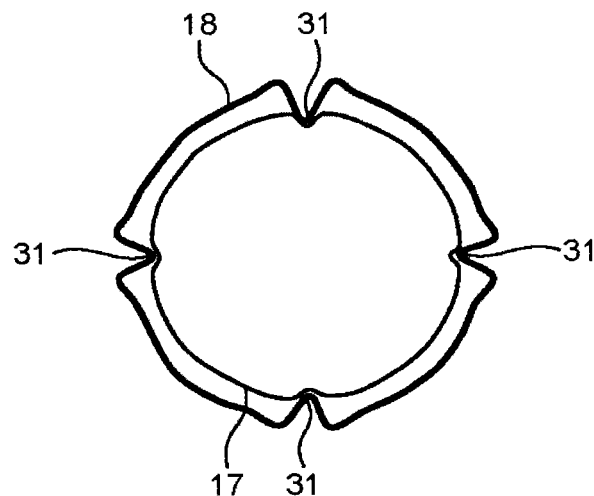
FIG. 23B is an explanatory diagram of an actual state of the contact state when the height of the projection=0.41 mm according to the embodiment.

FIG. 23B is an explanatory diagram of an actual state of the contact state when the height of the projection=0.41 mm.

Because the gap between the dielectric electrode 17 and the metal electrode 18 is 0.40 mm, all of the point-surface contact elements 31E are in the contact state as illustrated in FIG. 23A in a simulation result when the height of the projection 31 is assumed to be 0.41 mm. That is, it is found that all of the projections 31 are in an interference state.

As a result, the metal electrode 18 (the shell element 18S corresponding to the metal electrode 18) around the projection 31 is outwardly deformed, and the dielectric electrode 17 (the shell element 17S corresponding to the dielectric electrode 17) at the contact point is inwardly deformed.

As illustrated in FIG. 23B, all of the projections 31 are actually in contact with the dielectric electrode 17. That is, all of the projections 31 are in the interference state. As a result, the periphery of the projection 31 is outwardly deformed, and the dielectric electrode 17 at the contact point is inwardly deformed.

As described above, a force is consumed for local deformation, so that the reaction force is increased to be about seven times that in a case in which the height of the projection is 0.39 mm.

The height of the projection 31=0.40 mm is an intermediate state between the height of the projection 31=0.39 mm and the height of the projection 31=0.41 mm described above.

In a case in which the height of the projection 31=0.40 mm and the metal electrode 18 is bent by 0.50 mm, the number of contact points is 9 and the total value of the reaction force is 169.0 N. On the other hand, in a case in which the metal electrode 18 is not bent and the height of the projection 31=0.40 mm, the tube is not deformed although all of the projections 31 are brought into contact with the dielectric electrode 17, so that the reaction force is zero.

From the above examination, when the metal electrode 18 or the dielectric electrode 17 is bent, the height of the projection 31 needs to be slightly smaller than the discharge gap length d.

That is, the projection distal end gap α needs to be set as illustrated in FIG. 17B.

The optimum value of the projection distal end gap α is obtained.

For example, with the height of the projection 31 reduced by 0.10 mm to be 0.30 mm, the discharge gap length d is 0.30 mm when the projection 31 is brought into contact with the dielectric electrode 17. On the opposite side of the projection 31 in the contact state, the discharge gap length d with respect to the dielectric electrode 17 is 0.50 (=0.30+0.10×2) mm.

Accordingly, the variation in the discharge gap length d can be limited to ±0.1 mm as a limit value. On the other hand, when the height of the projection is made larger than 0.39 mm, that is, when the projection distal end gap α is made smaller than 0.01 mm, the number of contact points exceeds 3. Due to this, the projection distal end gap α is found to be appropriately within a range of 0.01 to 0.10 mm.

That is, when the design value of the discharge gap length d is 0.40 mm, the optimum value of the height of the projection 31 is 0.30 to 0.39 mm.

As illustrated in FIG. 10, the projection groups are arranged at three positions in the longitudinal direction of the metal electrode 18.

The optimum value of the number of projections per projection group is obtained in the following.

The number of projections constituting the projection group can be theoretically selected within a range of 3 to infinity.

Figure 24A:
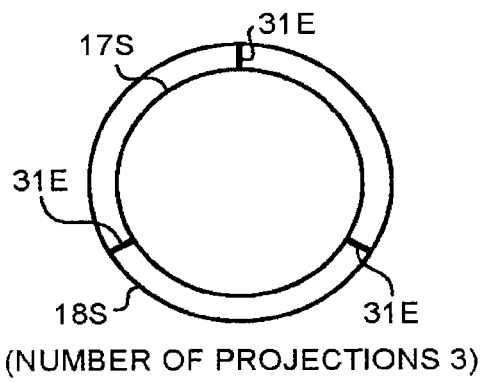
FIG. 24A is an explanatory diagram of a case in which the number of projections constituting a projection group=3 according to the embodiment.

FIG. 24A is an explanatory diagram of a case in which the number of projections constituting the projection group=3.

Figure 24B:
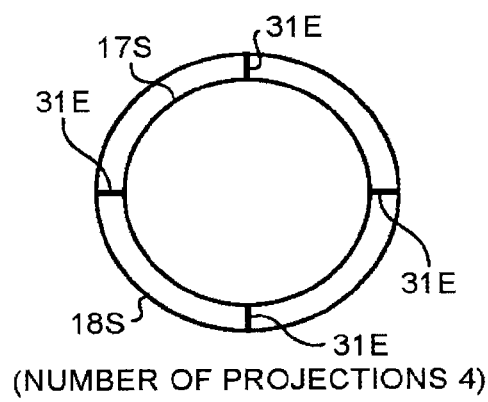
FIG. 24B is an explanatory diagram of a case in which the number of projections constituting the projection group=4 according to the embodiment.

FIG. 24B is an explanatory diagram of a case in which the number of projections constituting the projection group=4.

Figure 24C:
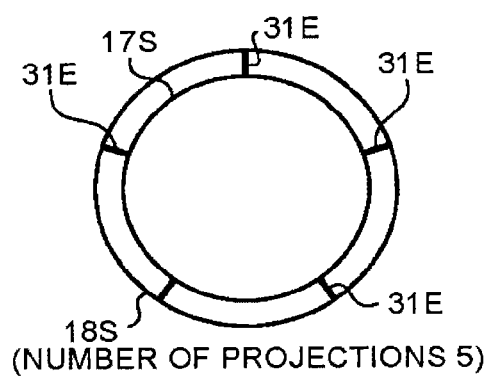
FIG. 24C is an explanatory diagram of a case in which the number of projections constituting the projection group=5 according to the embodiment.

FIG. 24C is an explanatory diagram of a case in which the number of projections constituting the projection group=5.

Figure 24D:
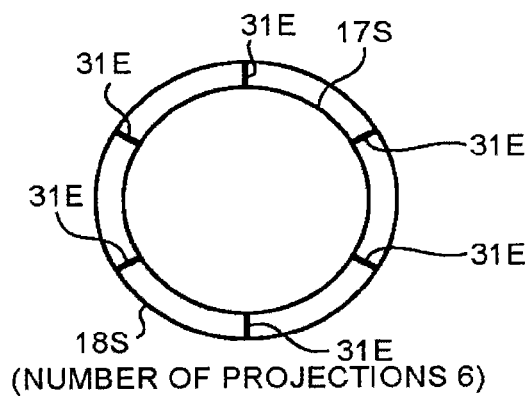
FIG. 24D is an explanatory diagram of a case in which the number of projections constituting the projection group=6 according to the embodiment.

FIG. 24D is an explanatory diagram of a case in which the number of projections constituting the projection group=6.

Similarly to the above, the projections 31 can be formed within physical limitation by arranging the projections 31 uniformly or substantially uniformly.

A case in which the number of projections 31=3 to 10 is evaluated herein considering actual production cost and the like.

Specifically, the reaction force generated at the point-surface contact element 31E is evaluated using the finite element method model illustrated in FIGS. 8A to 8C. When the reaction force is minimized, the frictional force at the time of insertion is also minimized. The gap of the point-surface contact element 31E is assumed to be 1.95 mm. This value corresponds to 0.40 mm as the actual height of the projection 31.

The value of the height of the projection 31=0.40 mm is the same as the space between the dielectric electrode 17 and the metal electrode 18 when the dielectric electrode 17 and the metal electrode 18 are both straight tubes.

However, in this examination, the finite element method model of the metal electrode 18 is assumed to be parabolically bent by 0.50 mm similarly to the above.

FIG. 25 is an explanatory diagram of a repulsive force calculation condition when the number of projections=3.

In a case of the number of projections 31=3, the repulsive force is calculated for cases of θ=15°, 30°, 45°, and 60° respectively, using any one of three point-surface contact elements 31E corresponding to the three projections 31 uniformly arranged on the same circumference as a reference (θ=0°).

In a case of the number of projections 31=4 or more, φ and $\theta_1$ to $\theta_4$ are obtained assuming that the number of projections 31=n (n is an integral number of 4 or more), and the repulsive force is calculated under four conditions of $\theta_1$ to $\theta_4$.

$$\phi = 360°/n$$

$$\theta_1 = 0°$$

$$\theta_2 = (1/3) \times (\phi/2)$$

$$\theta_3 = (2/3) \times (\phi/2)$$

$$\theta_4 = (3/3) \times (\phi/2)$$

For example, when n=4 is satisfied, φ, $\theta_1$, $\theta_2$, $\theta_3$, and $\theta_4$ are represented by the following expressions.

$$\phi = 360°/4 = 90°$$

$$\phi_1 = 0°$$

$$\theta_2 = (1/3) \times (\phi/2) = (1/3) \times (90°/2) = 15°$$

$$\theta_3 = (2/3) \times (\phi/2) = (2/3) \times (90°/2) = 30°$$

$$\theta_4 = (3/3) \times (\phi/2) = (3/3) \times (90°/2) = 45°$$

Figure 26:
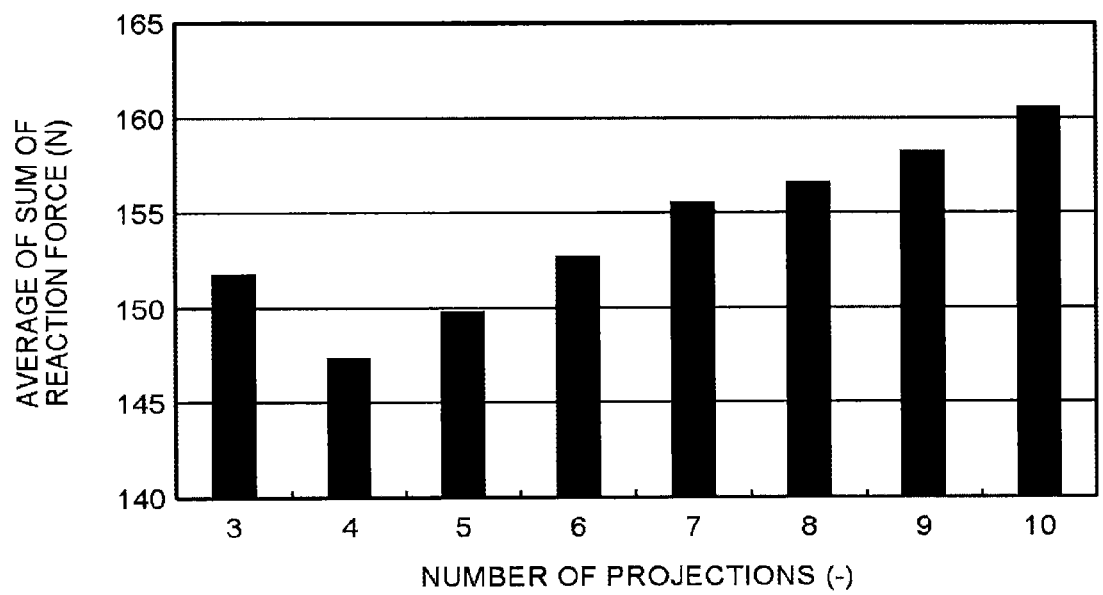
FIG. 26 is an explanatory diagram of the number of projections and an average value of the sum of the reaction force according to the embodiment.

FIG. 26 is an explanatory diagram of the number of projections and an average value of the sum of the reaction force.

As illustrated in FIG. 26, the reaction force is found to be minimized when the number of projections 31=4.

Accordingly, the optimum value of the number of projections 31 is 4 for one projection group.

The projection groups are arranged at three positions in the longitudinal direction, so that the total number of projections is 12. A case of the number of projections 31=5 for one projection group can be also employed, although not as good as the case of the number of projections 31=4 for one projection group.

The following examines a reason why the reaction force is large when the number of projections 31=3.

Figure 27:
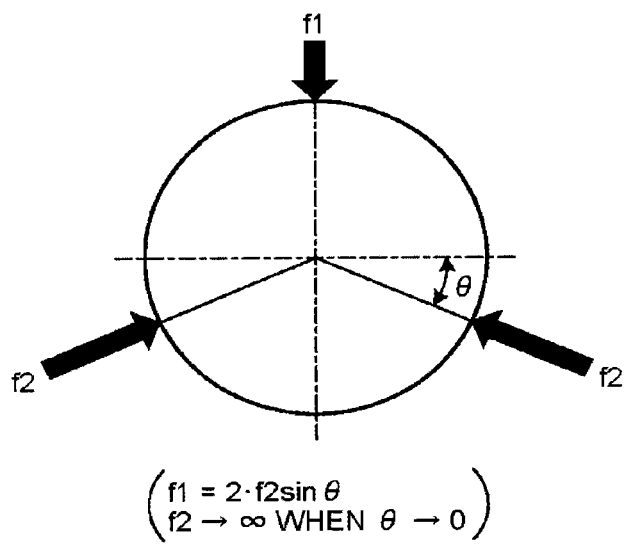
FIG. 27 is a diagram explaining a balance of the reaction force when the number of projections=3 according to the embodiment.

FIG. 27 is a diagram explaining a balance of the reaction force when the number of projections=3.

The force f1 is sufficient for bending the dielectric electrode 17 and the metal electrode 18. However, in a case of three-point supporting, an unnecessarily large reaction force f2 is generated due to a wedge effect. This is the reason why the reaction force is large when the number of projections 31=3.

The following examines a reason why the reaction force is large when the number of projections 31=5 or more.

The reason is considered that the number of contact points is increased with the increase in the number of projections when the number of projections 31=5 or more. That is, the dielectric electrode is excessively restrained.

In view of the reaction force, the number of projections is preferably 4 or more and as small as possible. In addition, coaxiality between the dielectric electrode 17 and the metal electrode 18 should be examined.

As described above, the optimum value of the height of the projection 31 is 0.30 to 0.39 mm when the design value of the discharge gap length d is 0.40 mm.

Figure 28:
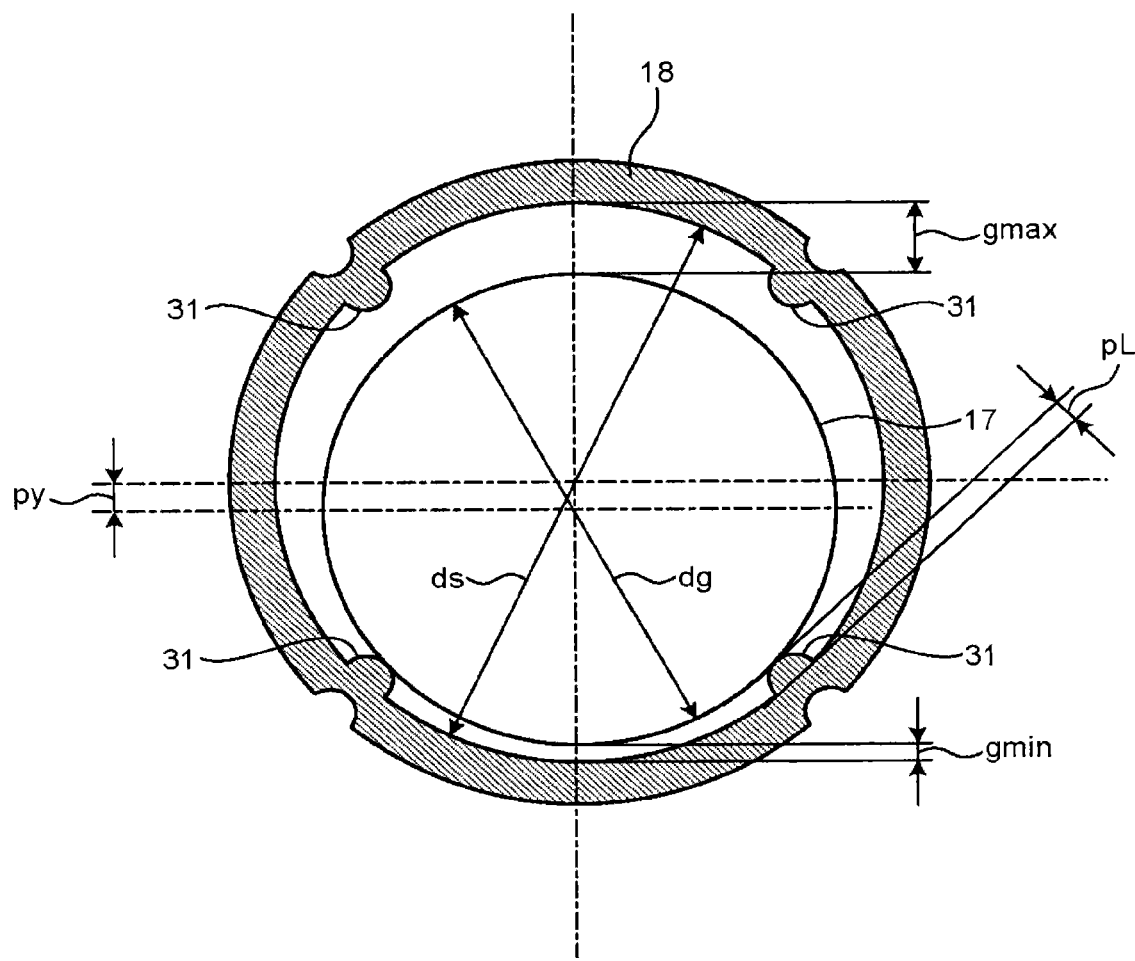
FIG. 28 is a diagram for examining coaxiality between the dielectric electrode and the metal electrode according to the embodiment.

FIG. 28 is a diagram for examining the coaxiality between the dielectric electrode and the metal electrode.

In FIG. 28, it is assumed that an outer diameter of the dielectric electrode 17=dg, an inner diameter of the metal electrode 18=ds, misalignment (eccentricity) between the center axis of the dielectric electrode 17 and the center axis of the metal electrode 18=py, the height of the projection 31=pL, a maximum gap between the dielectric electrode 17 and the metal electrode 18=gmax, and a minimum gap between the dielectric electrode 17 and the metal electrode 18=gmin.

The following examines a case in which the height of the projection 31 is 0.30 mm, that is, a lower limit.

When the height of the projection 31 is 0.30 mm, that is, a lower limit, upper two projections are not brought into contact with the dielectric electrode as illustrated in FIG. 28 because the height of the projection 31 is low. The minimum gap gmin is caused to be unfortunately smaller than the height of the projection pL.

Figure 29:
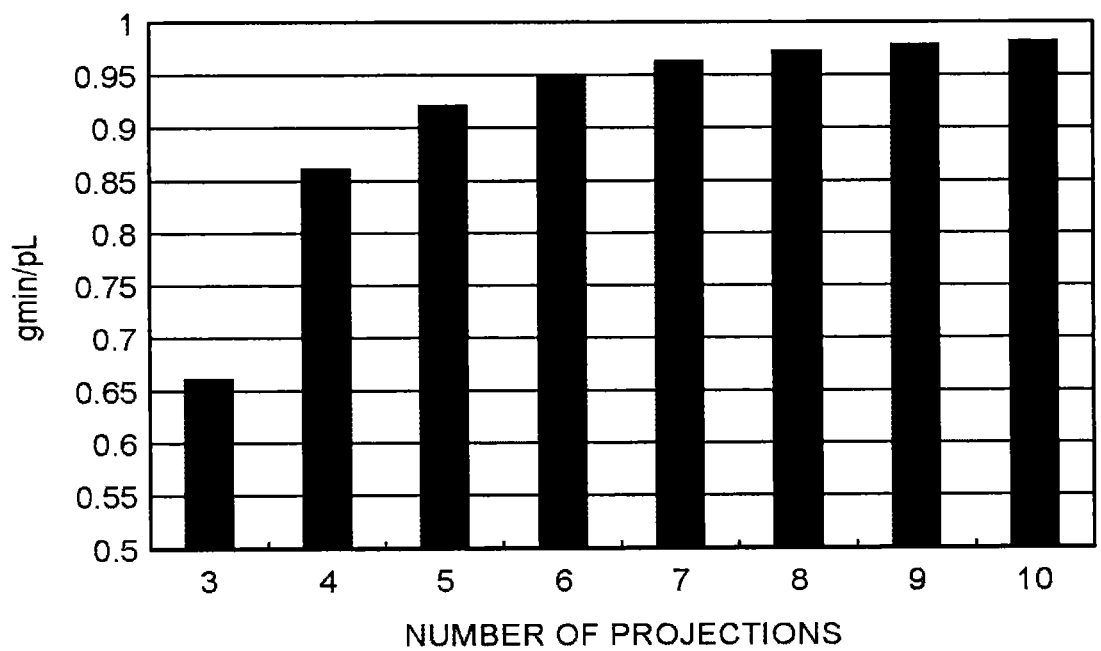
FIG. 29 is a diagram for explaining a relation between the number of projections and a degree in which a minimum gap is smaller than the height of the projection according to the embodiment.

FIG. 29 is a diagram explaining a relation between the number of projections and a degree in which the minimum gap is smaller than the height of the projection.

In FIG. 29, the degree in which the minimum gap gmin is smaller than the height of the projection pL is represented as (gmin/pL).

The calculation condition is such that the inner diameter of the metal electrode is 44.8 mm, the outer diameter of the dielectric electrode is 44.0 mm, and the height of the projection is 0.3 mm.

As illustrated in FIG. 29, the degree gmin/pL is equal to or smaller than 1, so that the minimum gap gmin is smaller than 0.3.

For example, when the number of projections is 6, gmin/pL≈0.95 is satisfied, so that the minimum gap gmin is as follows.

$$gmin = 0.3 \times 0.95$$
$$= 0.285 \text{ mm}$$

Accordingly, to cause the gap length d to be equal to or larger than 0.3 mm, the height of the projection 31 should be 0.315 mm. In this way, the height of the projection 31 needs to be fine-tuned depending on the number of projections (number of projecting points).

A fine-tuning amount (magnitude of fine-tuning) depends on the number of projections as illustrated in FIG. 29. It is found that gmin/pL is not much changed when the number of projections is equal to or larger than 6.

From the above examination, the number of projections can be said as follows.

(1) When the dielectric electrode or the metal electrode is bent, the reaction force thereof is the minimum when the number of projections is 4, and the reaction force increases with increase in the number of projections.

(2) The reaction force is especially large when the number of projections is 3.

(3) The degree gmin/pL in which the minimum gap gmin is smaller than the height of the projection pL is 0.65 when the number of projections=3, and the fine-tuning amount of the height of the projection 31 described above is increased. The fine-tuning amount of the height of the projection 31 is reduced as the number of projections increases.

(4) The fine-tuning amount of the height of the projection 31 is not much changed when the number of projections=6 or more.

From the above examination, the number of projections=3 is clearly excluded.

When the number of projections=4 or more, the reaction force increases with the increase in the number of projections, so that the number of projections is preferably small.

On the other hand, in view of gmin/pL, the number of projections is preferably small. When the number of projections is equal to or larger than 6, gmin/pL is not changed.

Accordingly, the appropriate numbers of projections=4, 5, and 6 is satisfied.

As illustrated in FIG. 21, three contact points are sufficient for bending the tube.

Increase in the number of contact points is a condition of excessively restraining the dielectric electrode 17 and the metal electrode 18 to increase the total value of the reaction force.

According to the above description, the number of projections constituting one projection group is 4 or 5.

Figure 30A:
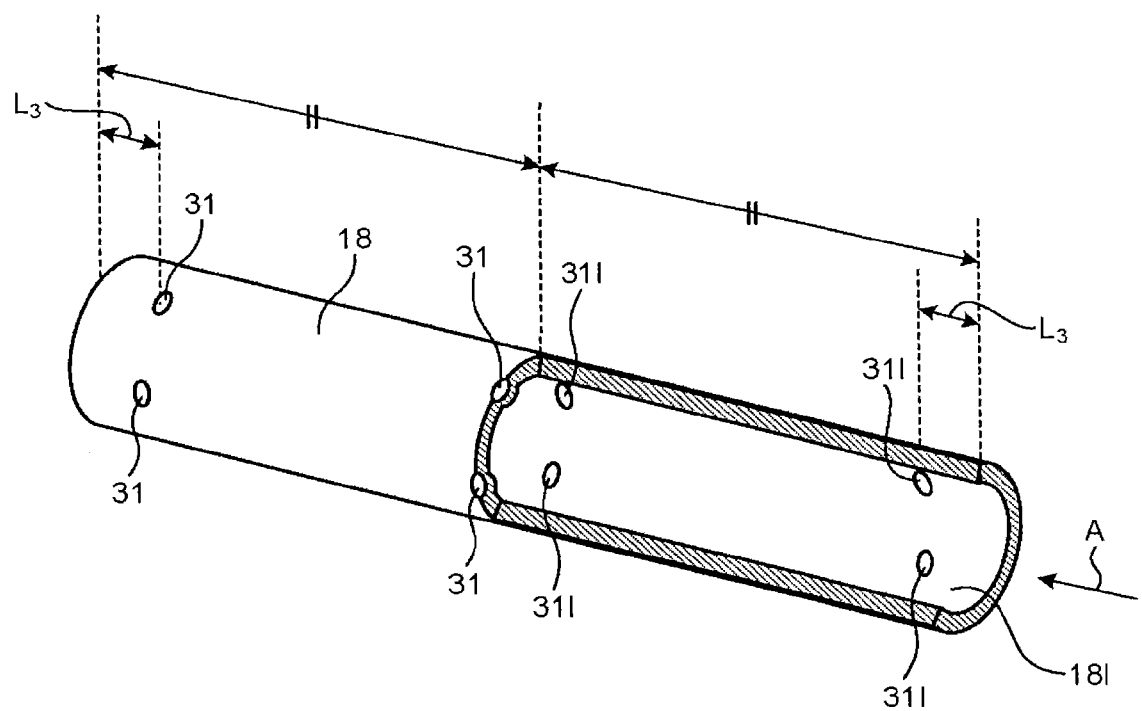
FIG. 30A is a partially cut perspective view of the vicinity of a part of the metal electrode at which the projection group is formed for explaining a more specific shape of the projection according to the embodiment.

FIG. 30A is a partially cut perspective view of the vicinity of a part of the metal electrode at which the projection group is formed for explaining a more specific shape of the projection.

Figure 30B:
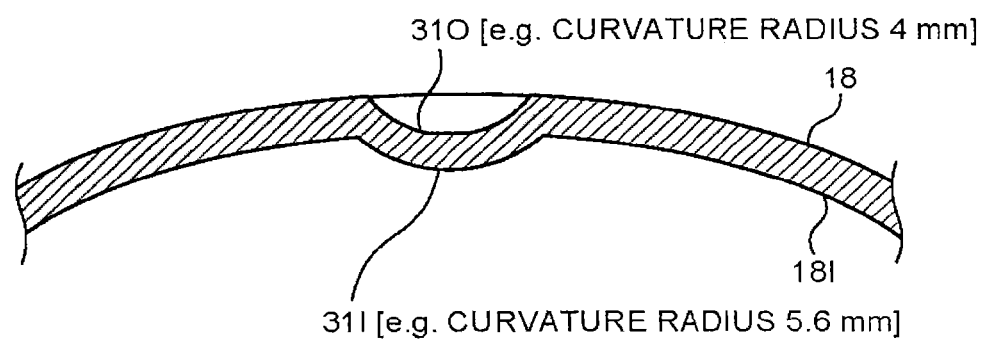
FIG. 30B is an enlarged sectional view viewed from the arrow A-direction in FIG. 30A according to the embodiment.

FIG. 30B is an enlarged sectional view viewed from the arrow A-direction in FIG. 30A.

As illustrated in FIG. 30A, the projections 31 are arranged at four positions on an outer peripheral surface of the metal electrode 18. As illustrated in FIG. 30B, each projection 31 has a dome shape, and a recessed part 310 on the outer peripheral surface side has a spherical shape having a curvature radius of 4 mm, for example. A projecting part 311 on the inner peripheral surface side has a spherical shape having a curvature radius of 5.6 mm, for example.

According to the above configuration, the projection 31 is formed to smoothly reduce the inner diameter on an inner face 181 of the metal electrode 18, so that the dielectric electrode 17 can be smoothly inserted into the metal electrode 18 without rapidly increasing friction resistance.

Figure 31:
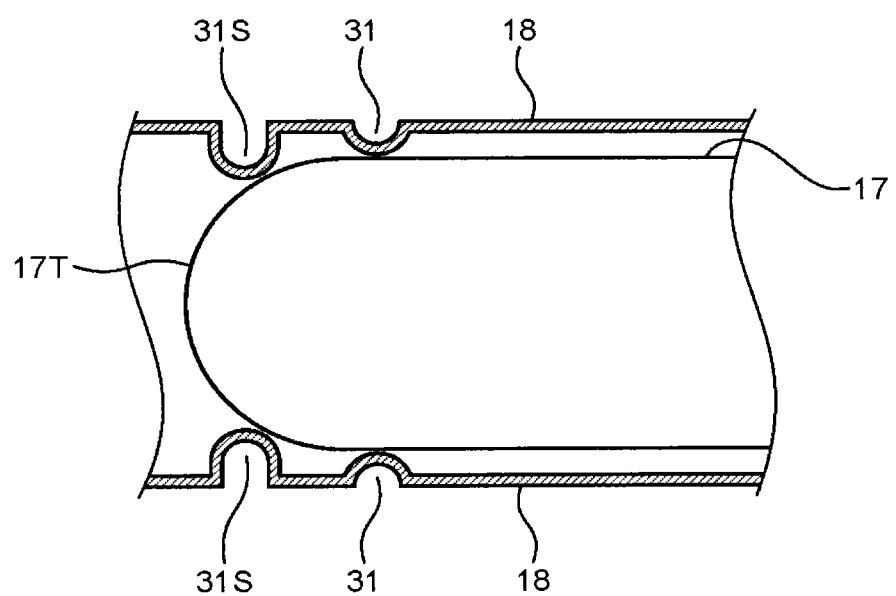
FIG. 31 is an explanatory diagram according to a modification of the embodiment.

FIG. 31 is an explanatory diagram of a modification of the embodiment.

As illustrated in FIG. 1, according to the embodiment, the dielectric electrodes 17 are coaxially inserted into the metal electrode 18 from both the left and the right directions in FIG. 1.

In the above configuration, the material gas and the generated ozone gas flow in one direction, from the gas inlet 23 to the gas outlet 24. Due to this, the dielectric electrode 17 may be moved in the longitudinal direction in the metal electrode 18 due to change in pressure and the like, so that the opposed dielectric electrodes 17 may be brought into contact with each other in some cases.

In the modification of the embodiment, such a movement of the dielectric electrode 17 is suppressed.

To suppress the movement of the dielectric electrode 17, according to the modification of the embodiment, a plurality of projections 31S for suppressing movement are arranged to be in contact with a distal end 17T of the dielectric electrode 17 as illustrated in FIG. 31.

With the above configuration, even when the dielectric electrode 17 is moved toward the distal end 17T side for some reasons, the dielectric electrode 17 is brought into contact with the projection 31S for suppressing movement and prevented from being moved, whereby the dielectric electrodes 17 are prevented from being in contact with each other.

The following summarizes the embodiment described above.

Assuming that the dielectric electrode 17 or the metal electrode 18 is bent, the positions of three projection groups in the longitudinal direction is calculated under the condition in which the deviation amount from the design value of the discharge gap length d is the minimum. In a case in which the dielectric electrode 17 or the metal electrode 18 is radially bent, the optimum value is $L_3/L=0.042$.

When the bending manner is the sine-curved shape, $L_3/L=0$, that is, the projection position is optimally at the end of the discharging space. An actual product design value within a range of $L_3/L=0.0$ to $0.1$ is sufficient for practical use.

The space between the distal end of the projection 31 and the dielectric electrode 17 is determined under the condition in which the frictional force is minimized when the dielectric electrode 17 is inserted into the metal electrode 18 assuming that the dielectric electrode 17 or the metal electrode 18 is bent. As a result, it is found that the space between the distal end of the projection 31 and the dielectric electrode 17 needs to be equal to or larger than 0.01 mm.

In this case, when the height of the projection 31 is reduced from 0.4 mm by 0.10 mm, the discharge gap is 0.30 mm when the projection 31 is brought into contact with the dielectric electrode 17, and is 0.50 mm on the opposite side. Accordingly, variation in the discharge gap length d can be limited to ±0.1 mm.

From the above description, the space between the distal end of the projection 31 and the dielectric electrode 17 is preferably 0.01 to 0.10 mm.

The number of projections 31 for one projection group is determined under the condition in which the frictional force is minimized when the dielectric electrode 17 is inserted into the metal electrode 18 assuming that the dielectric electrode 17 or the metal electrode 18 is bent.

As a result, the number of projections=4 is found to be optimum for one projection group.

As described above, according to the embodiment, even when the discharge gap length is smaller than 0.6 mm, higher yield of ozone can be achieved by supporting at three positions or more in the longitudinal direction and maintaining a constant discharge gap length in the longitudinal direction.

More specifically, the yield of ozone can be improved by suppressing decomposition of the generated ozone which is often caused when the discharge gap length is within a range of 0.3 mm to 0.5 mm, especially when the discharge gap length is around 0.4 mm.

In the above description, the projections 31 constituting one projection group are arranged on the same circumference. However, the projections 31 are not necessarily arranged on the same circumference, and may be arranged in an annular and belt-like region having a predetermined width. In this case, even when the metal electrode is bent, for example, the belt-like region may be provided so that the metal electrode is effectively assumed to be an ideal straight tube at a portion at which the projection is arranged.

Some embodiments according to the present invention have been described above. These embodiments are exemplary only, and do not intend to limit the scope of the invention. The novel embodiments can be implemented in various forms, and can be variously omitted, replaced, and changed without deviating from the gist of the invention. These embodiments and the modification thereof are included in the scope or the gist of the invention, and also included in the invention described in the claims and equivalents thereof.

The invention claimed is:

1. An ozone generating apparatus comprising:
   a cylindrical high-voltage electrode and a cylindrical low-voltage electrode that is arranged coaxially with respect to the cylindrical high-voltage electrode, the ozone generating apparatus applying a predetermined high voltage between the high-voltage electrode and the low-voltage electrode via a dielectric substance to cause discharge for generating ozone, wherein
   a discharge gap length d is 0.3 mm to 0.5 mm,
   any one of the low-voltage electrode and the high-voltage electrode is formed as a metal electrode, and the other one is formed as a dielectric electrode,
   a projection group including a plurality of projections having dome shape, which are arranged on same circumference of the metal electrode, is arranged on an inner peripheral surface of the metal electrode opposed to the dielectric electrode for holding the metal electrode to be coaxial with the dielectric electrode while keeping the discharge gap length, and
   the projection group is arranged at three or more positions, the positions including a center portion in a longitudinal direction of a discharging space and positions away from both ends of the discharging space by a predetermined distance $L_3$ which satisfies the following expression, $0.0 \le L_3/L \le 0.1$ where L is length of the discharging space.

2. The ozone generating apparatus of claim 1, wherein the predetermined distance $L_3$ is determined based on the position of the projection group, which minimizes a deviation amount of a discharge gap length in the discharging space with respect to a reference discharge gap length set in advance.

3. The ozone generating apparatus of claim 1, wherein a number of the projections including in the projection group is selected from four, five, or six based on a total value of reaction force caused by the projection and a fine-tuning amount of height of the projection.

4. The ozone generating apparatus of claim 3, wherein the projections constituting the projection group are arranged on same circumference or in an annular region having a predetermined width.

5. The ozone generating apparatus according to claim 1, wherein $0.01 \leq \alpha \leq 0.10$ mm is satisfied where a height of the projection from the inner peripheral surface of the metal electrode is represented by $(d-\alpha)$ with respect to the discharge gap length d.

6. The ozone generating apparatus according to claim 1, wherein the dielectric electrode is inserted into the metal electrode; and the metal electrode includes a plurality of projections for suppressing movement formed thereon, each projection for suppressing movement having dome shape, the projection for suppressing movement being higher than the projection, the projection for suppressing movement regulating movement of the dielectric electrode in an inserting direction by being in contact with a distal end of the inserted dielectric electrode.

* * * * *